(12) United States Patent
Hiraide et al.

(10) Patent No.: US 11,465,280 B2
(45) Date of Patent: Oct. 11, 2022

(54) ROBOT CONTROL DEVICE, ROBOT CONTROL METHOD, AND ROBOT SYSTEM

(71) Applicant: Seiko Epson Corporation, Tokyo (JP)

(72) Inventors: Toshinori Hiraide, Fujimi (JP); Shunsuke Toshimitsu, Azumino (JP)

(73) Assignee: Seiko Epson Corporation

( * ) Notice: Subject to any disclaimer, the term of this patent is extended or adjusted under 35 U.S.C. 154(b) by 211 days.

(21) Appl. No.: 16/829,103

(22) Filed: Mar. 25, 2020

(65) Prior Publication Data
US 2020/0306961 A1 Oct. 1, 2020

(30) Foreign Application Priority Data

Mar. 26, 2019 (JP) .............................. JP2019-057543

(51) Int. Cl.
*B25J 9/16* (2006.01)

(52) U.S. Cl.
CPC .................................. *B25J 9/1628* (2013.01)

(58) Field of Classification Search
CPC ............ G05B 2219/39195; G05B 2219/41166
See application file for complete search history.

(56) References Cited

U.S. PATENT DOCUMENTS

| | | | |
|---|---|---|---|
| 2001/0033146 A1 | 10/2001 | Kato et al. | |
| 2012/0065902 A1* | 3/2012 | Nakajima | ............. B25J 13/085 |
| | | | 702/41 |
| 2014/0156070 A1* | 6/2014 | Merry | .................. B25J 9/1653 |
| | | | 700/253 |
| 2018/0281183 A1 | 10/2018 | Hiraide et al. | |
| 2018/0281185 A1* | 10/2018 | Toshimitsu | ............ B25J 9/1633 |
| 2018/0281186 A1 | 10/2018 | Hiraide et al. | |

FOREIGN PATENT DOCUMENTS

| | | |
|---|---|---|
| JP | 2001-293638 A | 10/2001 |
| JP | 2007-272597 A | 10/2007 |
| JP | 2018-171664 A | 11/2018 |
| JP | 2018-171665 A | 11/2018 |

\* cited by examiner

*Primary Examiner* — Nicholas Kiswanto
*Assistant Examiner* — Dylan Brandon Mooney
(74) *Attorney, Agent, or Firm* — Harness, Dickey & Pierce, P.L.C.

(57) ABSTRACT

A control device includes a second-control-signal generating section configured to reduce a predetermined frequency component from a first control signal for performing operation for moving a movable section of the robot to generate a second control signal and a storing section having stored therein reference information including information concerning combinations of ranges of positions of a control point of the robot and frequencies. The second-control-signal generating section determines, based on a position of the control point of the robot in the operation, with reference to the reference information, a frequency component to be reduced from the first control signal.

18 Claims, 11 Drawing Sheets

*FIG. 5*

| | | DISTANCE Rtcp FROM REFERENCE POINT O2 ||
| | | Rtcp < Rth | Rtcp ≥ Rth |
|---|---|---|---|
| ANGLE θ FROM REFERENCE AXIS | θ ≥ θth | F11 | F21 |
| | θ < θth | — | — |

ROBOT CONTROL DEVICE, ROBOT CONTROL METHOD, AND ROBOT SYSTEM

The present application is based on, and claims priority from JP Application Serial Number 2019-057543, filed Mar. 26, 2019, the disclosure of which is hereby incorporated by reference herein in its entirety.

BACKGROUND

1. Technical Field

The present disclosure relates to a technique for reducing vibration in a robot.

2. Related Art

In the robot technology, there has been the following technique for reducing vibration of a workpiece held by an end effector. In the technique disclosed in JP A-2001-293638 (Patent Literature 1), the frequency of resonance of a robot in a state in which the workpiece is held by the end effector is specified in advance. A band-stop filter is applied to a torque control signal (which can be grasped as a function of time) given to a current control section that drives and controls a servomotor of the robot. A component of the frequency is removed from the torque control signal. As a result, the torque control signal not including the component of the frequency is given to the current control section. The servomotor driven and controlled by the current control section based on the torque control signal does not cause the workpiece held by the end effector to resonate at the frequency.

A resonance frequency in the robot is different depending on the position of a control point of the robot. Therefore, even if it is possible to, for a certain operation, measure vibration of the robot to specify a resonance frequency and apply the band-stop filter to the torque control signal to reduce the vibration, when causing the robot to execute another operation, the vibration cannot be sufficiently reduced if the setting for specifying the resonance frequency is kept. Therefore, when causing the robot to perform a new operation, it is necessary to, for the operation, measure vibration of the robot, reset the band-stop filter, and apply the band-stop filter to the torque control signal again. It is complicated for a user to perform such processing every time the user teaches a new operation to the robot.

SUMMARY

According to an aspect of the present disclosure, a control device for controlling a robot is provided. The control device includes: a second-control-signal generating section configured to reduce a predetermined frequency component from a first control signal for performing operation for moving a movable section of the robot; and a storing section having stored therein reference information including information concerning combinations of ranges of positions of a control point of the robot and frequencies. The second-control-signal generating section determines, based on a position of the control point of the robot in the operation, with reference to the reference information, a frequency component to be reduced from the first control signal.

BRIEF DESCRIPTION OF THE DRAWINGS

FIG. 5 is a table showing information stored in reference information.

DESCRIPTION OF EXEMPLARY EMBODIMENTS

A. First Embodiment

A1. Configuration of a Robot System

Figure 1:
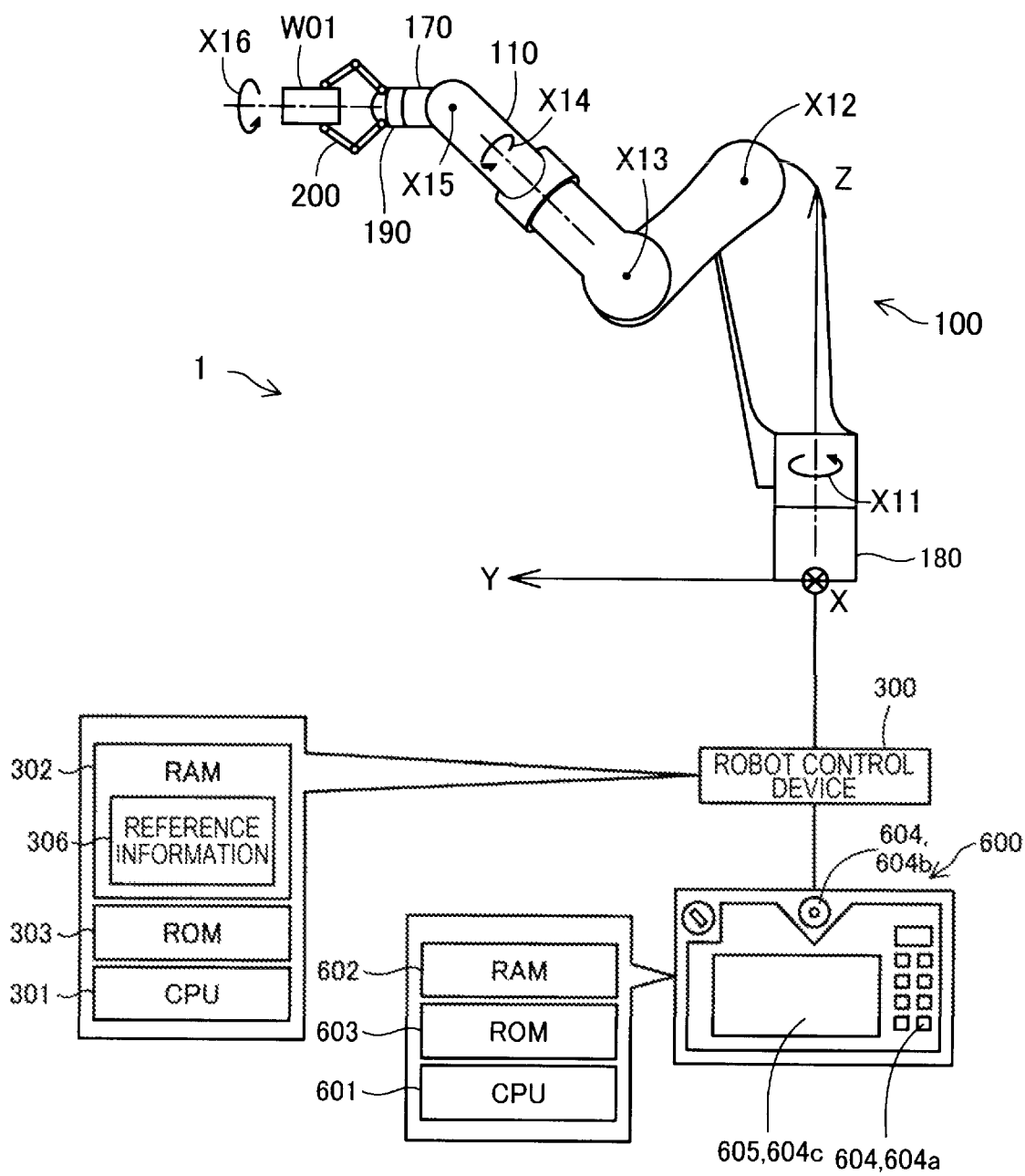
FIG. 1 is an explanatory diagram showing a robot system in an embodiment.

FIG. 1 is an explanatory diagram showing a robot system in a first embodiment. A robot system 1 in this embodiment includes a robot 100, an end effector 200, a robot control device 300, and a teaching device 600.

The robot 100 is a six-axis robot including an arm 110 including six rotary joints X11 to X16. The arm 110 is supported by a base 180. The joints X11, X14, and X16 are torsion joints. The joints X12, X13, and X15 are bending joints. The robot 100 can arrange the end effector 200, which is attached to a distal end 170 of the arm 110, in a designated position in a three-dimensional space and in a designated posture by rotating the six joints X11 to X16 respectively with servomotors. The distal end 170 of the arm 110, to which the end effector 200 is attached, is, of both ends of the arm 110, the opposite end of an end coupled to the base 180.

A point representing the position of the end effector 200 in the three-dimensional space is also referred to as TCP (Tool Center Point). In this embodiment, the TCP serving as a control point is present at the distal end 170 of the arm 110 of the robot 100.

In FIG. 1, a coordinate system defining, based on the position of the base 180, a space in which the robot 100 is set is referred to as robot coordinate system. The robot coordinate system is a three-dimensional orthogonal coordinate system defined by an X axis and a Y axis orthogonal to each other on the horizontal plane and a Z axis having a positive direction in the vertical upward direction. In this specification, simple description of "X axis" represents the X axis in the robot coordinate system. Simple description of "Y axis" represents the Y axis in the robot coordinate system. Simple description of "Z axis" represents the Z axis in the robot coordinate system. Any position in the robot coordinate system can be specified by a position in a X-axis direction, a position in a Y-axis direction, and a position in a Z-axis direction.

The distal end 170 of the arm 110 of the robot 100 is formed in a flange shape, that is, a disk shape. The robot 100 includes a force sensor 190 at the distal end 170 of the arm 110. The end effector 200 is attached to the distal end 170 of the arm 110 of the robot 100 via the force sensor 190. The force sensor 190 can measure forces in the three axis directions of the X axis, the Y axis, and the Z axis and torques around the X axis, the Y axis, and the Z axis acting on the end effector 200. An output of the force sensor 190 is transmitted to the robot control device 300 and used for controlling the robot 100.

The end effector 200 is attached to the distal end 170 of the arm 110. The end effector 200 is controlled by the robot control device 300 to be able to grip a workpiece W01 and release the gripped workpiece W01. As a result, for example, the robot 100 and the end effector 200 are controlled by the robot control device 300 to be able to grip and move the workpiece W01. The workpiece W01 is specifically an object on which the robot 100 performs work.

The robot control device 300 is coupled to the robot 100 and controls the operation of the robot 100. More specifically, the robot control device 300 drives servomotors 410 that move the joints X11 to X16 of the robot 100. The robot control device 300 includes a CPU (Central Processing Unit) 301, which is a processor, a RAM (Random Access Memory) 302, and a ROM (Read-Only Memory) 303. A control program for controlling the robot 100 is installed in the robot control device 300. In the robot control device 300, the CPU 301, the RAM 302, and the ROM 303, which are hardware resources, and the control program cooperate. Specifically, the CPU 301 realizes various functions by loading computer programs stored in the ROM 303 to the RAM 302 and executing the computer programs.

The teaching device 600 is a device for teaching a target position St and a target force fSt to the robot control device 300. The target force fSt can include, as components, a linearly acting force and torque. The teaching device 600 is a so-called "teaching pendant". When the robot control device 300 causes the robot 100 to execute work, the teaching device 600 teaches the operation of the robot 100 to the robot control device 300 in advance. The robot control device 300 stores a result of the teaching in the RAM 302 as data. At a stage of causing the robot 100 to execute the work, the robot control device 300 controls the robot 100 based on the data representing the teaching result stored in the RAM 302.

The teaching device 600 includes a CPU 601, which is a processor, a RAM 602, and a ROM 603. A control program for teaching the target position St and the target force fSt to the robot control device 300 is installed in the teaching device 600. In the teaching device 600, the CPU 601, the RAM 602, and the ROM 603, which are hardware resources, and the control program cooperate. Specifically, the CPU 601 realizes various functions by loading computer programs stored in the ROM 603 to the RAM 602 and executing the computer programs.

The teaching device 600 further includes input devices 604 and output devices 605. The input devices 604 receive instructions from the user. The input devices 604 are, for example, a keyboard 604a, an operation lever 604b, and a touch panel 604c. The output devices 605 output various kinds of information including a user interface and a warning for operation setting for the robot 100 to the user. The output devices 605 are, for example, a liquid crystal display and a speaker. In this embodiment, the touch panel 604c, which is one of the input devices 604, is provided on the liquid crystal display, which is one of the output devices 605.

Figure 2:
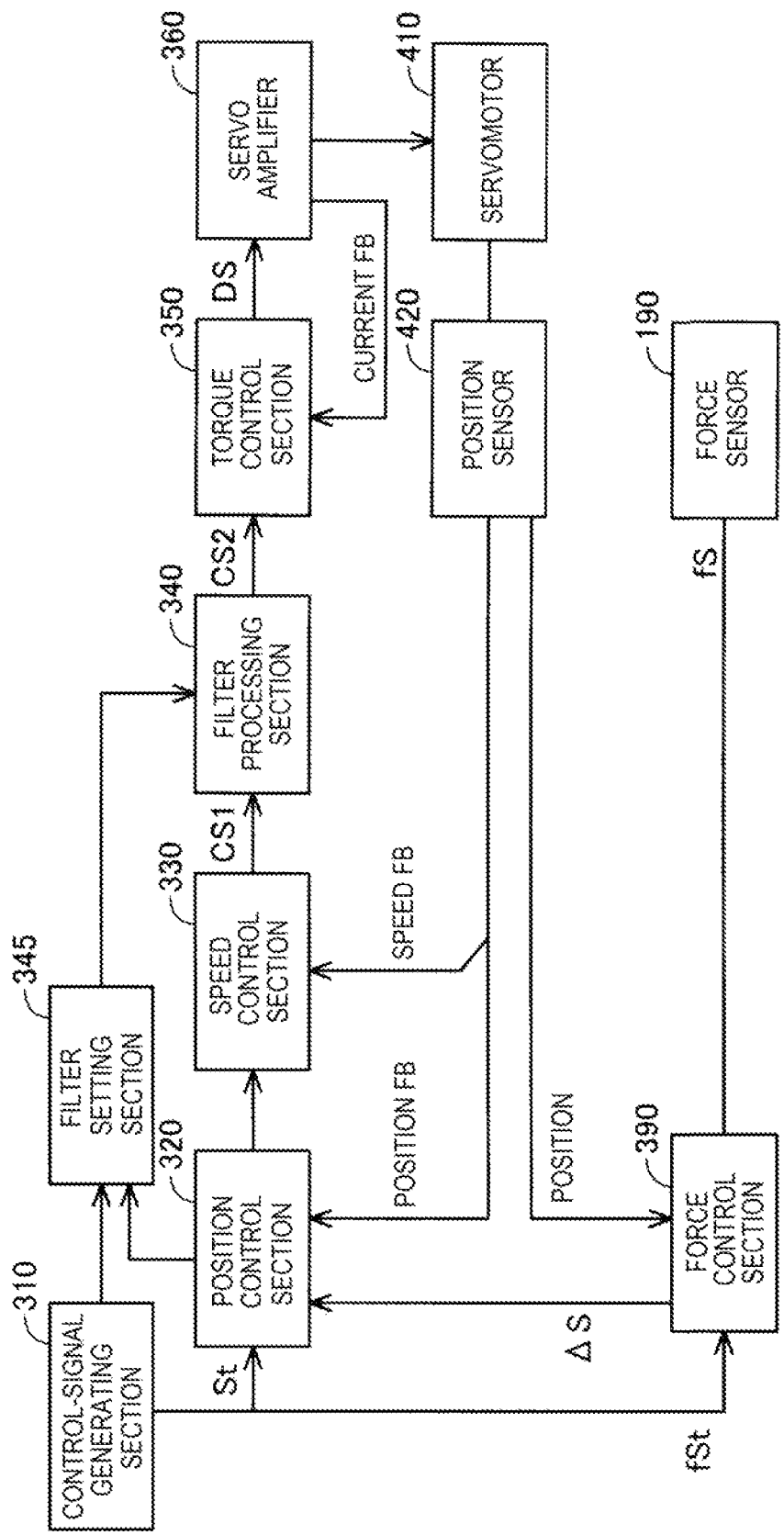
FIG. 2 is a block diagram showing a relation among components of a robot control device, servomotors, a position sensor and a force sensor included in a robot.

FIG. 2 is a block diagram showing a relation between the components of the robot control device 300 and the servomotors 410, a position sensor 420, and the force sensor 190 included in the robot 100. The robot control device 300 includes, as functional sections thereof, a control-signal generating section 310, a position control section 320, a speed control section 330, a filter processing section 340, a torque control section 350, a servo amplifier 360, a filter setting section 345, and a force control section 390. The control-signal generating section 310, the position control section 320, the speed control section 330, the filter processing section 340, the filter setting section 345, the torque control section 350, and the force control section 390 are realized by the CPU 301.

The control-signal generating section 310 generates a position control signal representing the target position St where the end effector 200 should be located and outputs the position control signal to the position control section 320. When an instruction to carry out force control is received from the user, the control-signal generating section 310 generates a force control signal representing the target force fSt, that is, a force to be generated by the end effector 200 and a direction of the force and torque to be generated by the end effector 200 and a direction of the torque and outputs the force control signal to the force control section 390. The control-signal generating section 310 outputs a command representing operation being executed by the robot 100 to the filter setting section 345.

The force control section 390 receives, from the control-signal generating section 310, the force control signal representing, the target force fSt, that is, the force to be generated by the end effector 200 and the direction of the force and the torque to be generated by the end effector 200 and the direction of the torque. The force control section 390 receives, from the force sensor 190, forces in the three axis directions of the X axis, the Y axis, and the Z axis and torques around a U axis, a V axis, and a W axis acting on the end effector 200. The forces in the three axis directions of the X axis, the Y axis, and the Z axis and the torques around the U axis, the V axis, and the W axis acting on the end effector 200 are collectively described as fS in FIG. 2. A U-axis direction is a rotating direction having a center axis in the X-axis direction. A V-axis direction is a rotating direction having a center axis in the Y-axis direction. A W-axis direction is a rotating direction having a center axis in the Z-axis direction. The force control section 390 receives rotating positions of the servomotors 410 from the position sensor 420 of the robot 100. The force control section 390 determines, based on those parameters, a position correction amount ΔS and outputs a signal representing the position correction amount ΔS to the position control section 320.

The position control section 320 receives the position control signal representing the target position St from the control-signal generating section 310. The position control section 320 receives the signal representing the position correction amount ΔS from the force control section 390. The position control section 320 receives, as a position feedback, the rotating positions of the servomotors 410 from the position sensor 420 of the robot 100. The position control section 320 generates, based on information concerning the target position, the position correction amount, and the rotating positions, a speed control signal for the servomotors 410 of the robot 100 and outputs the speed control signal to the speed control section 330 and the filter setting section 345.

When an instruction for carrying out the force control is not received from the control-signal generating section 310, in the generation of the speed control signal, the position control section 320 does not consider the information received from the force control section 390.

The speed control section 330 receives the speed control signal from the position control section 320. The speed control section 330 receives, as a speed feedback, rotating speeds of the servomotors 410 from the position sensor 420 of the robot 100. The speed control section 330 generates a torque control signal based on the speed control signal and the rotating speeds of the servomotors 410 and outputs the torque control signal to the filter processing section 340.

The filter setting section 345 receives, from the control-signal generating section 310, a command representing operation being executed. The filter setting section 345 generates, according to the received command, with reference to reference information, a control signal for instructing one or more frequency components to be removed from the torque control signal and outputs the control signal to the filter processing section 340. The filter setting section 345 can also output, to the filter processing section 340, a control signal to the effect that a frequency component to be removed from the torque control signal is absent.

The filter processing section 340 receives the torque control signal from the speed control section 330. The filter processing section 340 receives, from the filter setting section 345, a control signal for one or more frequency components to be removed. The filter processing section 340 performs, on the torque control signal output by the speed control section 330, processing for removing one or more frequency components corresponding to the torque control signal using a band-stop filter, generates a new torque control signal, and outputs the new torque control signal. More specifically, a specific frequency component is reduced by −30 dB by the filter processing section 340.

The filter processing section 340 reduces, from the control signal, a component in a frequency range having a predetermined width including the specific frequency and generates a new control signal. Specifically, a frequency component in a range of the specific frequency ±Δf is reduced. In this embodiment, Δf is 1 Hz.

Both of the torque control signal output by the speed control section 330 and the new torque control signal generated by the filter processing section 340 are control signals for performing operation for moving the arm 110 and the end effector 200. The torque control signal output by the speed control section 330 is referred to as "first control signal CS1". The new torque control signal generated by the filter processing section 340 is referred to as "second control signal CS2".

The frequency component removed in the filter processing section 340 is a component of a frequency predetermined according to a command representing operation being executed. The frequency predetermined according to the command representing the operation being executed is, for example, (i) the frequency of vibration of the robot 100 in the posture of the robot 100 at an end point in time of the operation, (ii) the frequency of vibration of the robot 100 in the posture of the robot 100 at a start point in time of the operation, and (iii) the frequency of vibration of the robot 100 in the posture of the robot 100 at the time when a control point is present at a point where speed is changed in the operation.

In this specification, processing for reducing a predetermined frequency component in a control signal such as a torque control signal to thereby reduce resonance of a control object by the frequency is referred to as "vibration reduction processing". A function of reducing a predetermined frequency component in a control signal to thereby reduce resonance of a control object by the frequency is referred to as "vibration reducing function".

When receiving, from the filter setting section 345, the control signal to the effect that a frequency to be removed is absent, the filter processing section 340 outputs the torque control signal received from the speed control section 330 as it is. By performing such processing, it is possible to drive the robot 100 based on the torque control signal received from the speed control section 330 in a manner faithful to an original control signal.

The torque control section 350 receives a torque control signal from the filter processing section 340. The torque control section 350 receives, from the servo amplifier 360, feedback signals representing current amounts of electric currents supplied to the servomotors 410. The torque control section 350 generates, based on the torque control signal and the current feedback signals to the servomotors 410, a driving signal DS for driving the robot 100. More specifically, the torque control section 350 determines, based on the torque control signal and the current feedback signals to the servomotors 410, current amounts supplied to the servomotors 410 and drives the servomotors 410 via the servo amplifier 360.

A2. Vibration Reducing Function Setting

Figure 3:
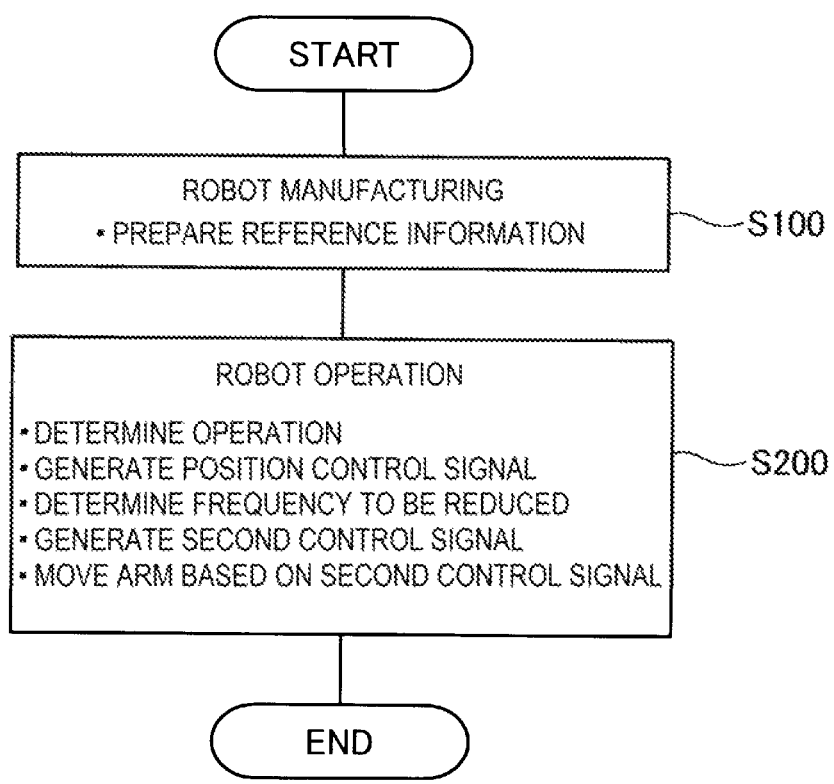
FIG. 3 is a flowchart showing a flow of the operation of the robot system in the embodiment.

FIG. 3 is a flowchart showing a flow of the operation of the robot system 1 in this embodiment. In the operation of the robot system 1 in this embodiment, first, a robot is manufactured in step S100. When the robot is manufactured, reference information 306 including information concerning one or more combinations of ranges of the position of the control point TCP of the robot 100 and frequencies to be reduced in the vibration reduction processing is generated. The reference information 306 is stored in the RAM 302 (see FIG. 1). In other words, the reference information 306 is prepared prior to the operation of the robot 100 in step S200.

In step S200, the operation of the robot 100 is performed and the robot 100 is used for product manufacturing. More specifically, operation for causing the robot 100 to execute work is determined. The robot control device 300 executes this processing according to an instruction received from the user via the teaching device 600.

The control-signal generating section 310 (see FIG. 2) of the robot control device 300 generates a position control signal representing target positions in respective operations. The filter setting section 345 of the robot control device 300 determines, based on information concerning the positions of the control point TCP of the robot 100 in the respective operations, with reference to the reference information 306, a frequency component to be reduced from the first control signal CS1. The determination of a frequency component is further explained below.

Thereafter, the filter processing section 340 of the robot control device 300 performs, on the first control signal CS1 received from the speed control section 330, processing for removing a frequency component and generates the second control signal CS2 (see FIG. 2). The torque control section 350 of the robot control device 300 receives the second control signal CS2 from the filter processing section 340, drives the servomotors 410 based on the second control signal CS2, and moves the arm 110. The robot 100 is finally controlled by the processing shown in FIG. 3. Therefore, the processing shown in FIG. 3 can also be grasped as a control method for the robot 100 in a broad sense.

Figure 4:
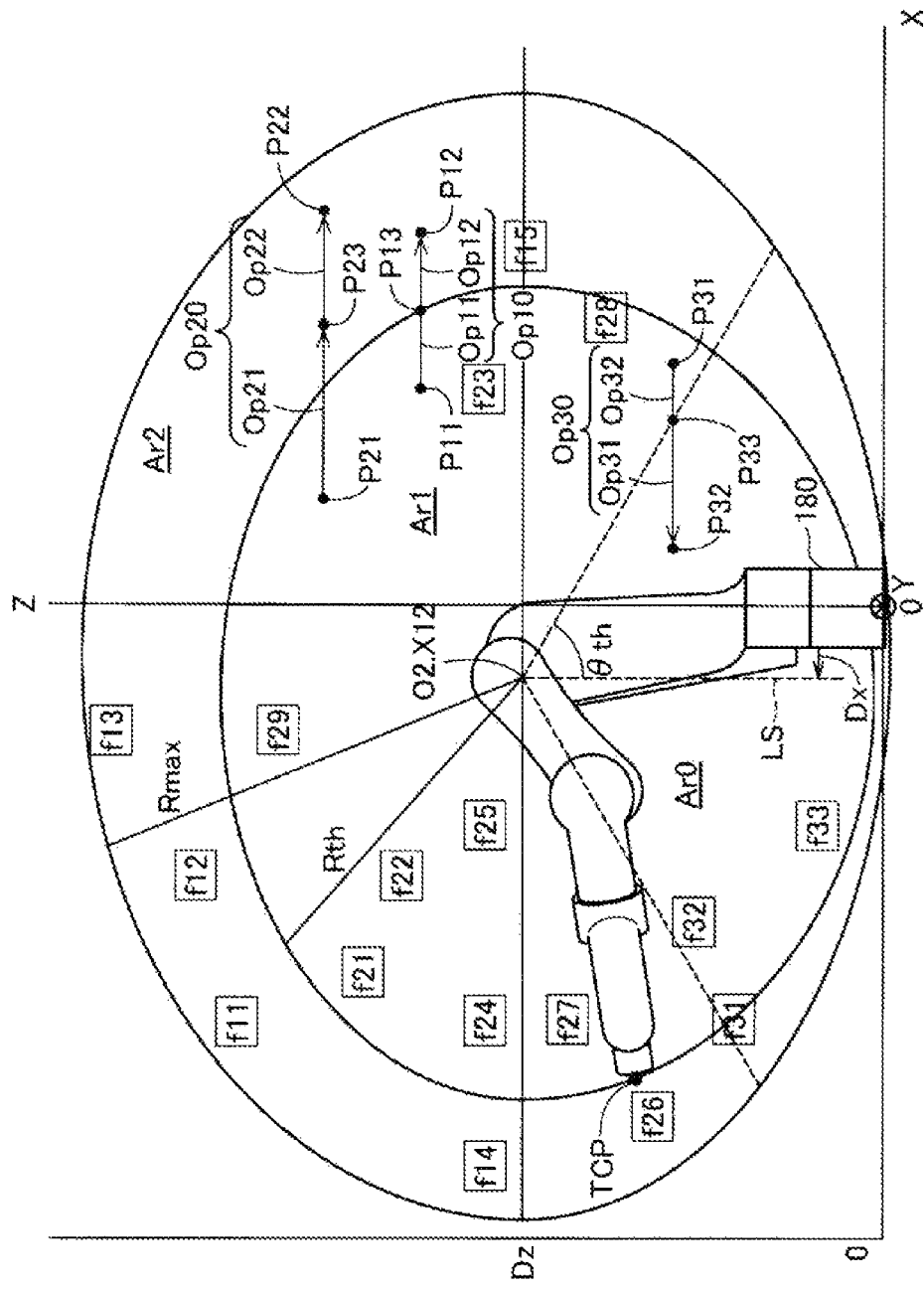
FIG. 4 is an explanatory diagram showing a range of positions of a control point of the robot associated with frequencies reduced in vibration reduction processing.

FIG. 4 is an explanatory diagram showing the range of the positions of the control point TCP of the robot 100 associated with the frequencies reduced in the vibration reduction processing. In FIG. 4, the robot 100 is drawn in a posture in which a rotation axis of the joint X12 of the robot 100 is parallel to the Y axis of the robot coordinate system. The joint X12 is a bending joint closest to the base 180 in the robot 100. In FIG. 4, the joint X12 of the robot 100 is offset by Dx in the negative direction of the X axis and is offset by Dz in the positive direction of the Z axis with respect to an origin O of the robot coordinate system. In the following explanation, the position of the rotating axis of the joint X12, the position being a position crossing an XZ plane of the robot coordinate system, is referred to as reference point O2. In FIG. 4, a dimension in the X-axis direction and a dimension in the Z-axis direction are not drawn at a ratio of 1:1.

Ranges Ar0, Ar1, and Ar2 of three positions are decided based on the reference point O2 with respect to the robot 100. The reference information 306 (see FIG. 1) referred to in determining a frequency reduced in the vibration reduction processing includes information concerning combinations of the ranges Ar0, Ar1, and Ar2 of the positions of the control point TCP of the robot 100 shown in FIG. 4 and frequencies.

The reference information 306 is generated by the following processing (see S100 in FIG. 3). First, the control point TCP is arranged in various positions with respect to the reference point O2. Resonance frequencies of the robot 100 at the times when the control point TCP is arranged in the positions are measured. The measurement is performed using acceleration sensors for six axes attached to the distal end 170 of the arm 110. More specifically, the acceleration sensors are attached to the tip of the force sensor 190. Measurement results of the acceleration sensors are shown as resonance frequencies f11 to f15, f21 to f29, and f31 to f33 in the respective positions of the control point TCP with respect to the reference point O2. The resonance frequencies f11 to f15, f21 to f29, and f31 to f33 have higher values in the order of the resonance frequencies (f11<f33). The resonance frequencies adjacent to each other when the resonance frequencies f11 to f15, f21 to f29, and f31 to f33 are arranged according to size sometimes have measurement values equal to each other.

It is roughly seen from FIG. 4 that the resonance frequencies are high (see f31 to f33) in a range including the base 180 below the reference point O2, the resonance frequencies are low (see f11 to f15) in a range of positions far from the reference point O2, and the resonance frequencies are in the medium degree (see f21 to f29) in a range of positions close to the reference point O2. Therefore, in the reference information 306 in this embodiment, the resonance frequencies are divided into three groups. The ranges Ar0, Ar1, and Ar2 of positions including respective points where the resonance frequencies are measured are respectively associated with the three groups.

A non-reduction range Ar0 has a conical shape having the reference point O2 as a vertex, having, as a center axis, a reference line LS extending in the negative direction of the Z axis from the reference point O2, and having an XY plane of the robot coordinate system as a bottom surface. An angle formed by a conical busbar with the reference line LS is represented as θth. The non-reduction range Ar0 includes the base 180.

A first range Ar1 is a space obtained by excluding the non-reduction range Ar0 from a spherical space centering on the reference point O2 and having a radius Rth having a predetermined size. In FIG. 4, the dimension in the X-axis direction and the dimension in the Z-axis direction are not drawn at a ratio of 1:1. Therefore, in FIG. 4, the shape of the outer edge of the first range Ar1 is an ellipse rather than a circle.

A second range Ar2 is a space surrounding the first range Ar1. A curved surface defining the outer edge of the second range Ar2 is the outer edge of positions that the control point TCP at the distal end 170 of the arm 110 can take. The second range Ar2 is a space obtained by excluding the non-reduction range Ar0 and the first range Ar1 from a space surrounded by the outer edge decided in that way.

An intermediate value [(f15−f11)/2] between a maximum value and a minimum value of the resonance frequencies f11 to f15 associated with the first range Ar1 is allocated to the first range Ar1 as a frequency F11 to be reduced. An intermediate value [(f29−f21)/2] between a maximum value and a minimum value of the resonance frequencies f21 to f29 associated with the second range Ar2 is allocated to the second range Ar2 as a frequency F21 to be reduced. A frequency to be reduced is not allocated to the non-reduction range Ar0.

The frequency ranges of the resonance frequencies f11 to f15 and f21 to f29 are grouped such that an interval between the intermediate values of the maximum values and the minimum values in the groups is larger than (Δf×2). (Δf×2) is the width of frequency components to be processed when the filter processing section 340 (see FIG. 2) reduces the frequency components. In the range Ar1 of positions associated with the group of the resonance frequencies f11 to f15 decided in this way and the range Ar2 of positions associated with the group of the resonance frequencies f21 to f29 decided in this way, frequency ranges to be reduced in the vibration reduction processing do not overlap each other. In other words, division of the ranges of the positions associated with the frequencies to be reduced is set such that the ranges of the frequencies reduced in the vibration reduction processing do not overlap each other.

The reference information 306 (see FIG. 1) includes information concerning a combination of the first range Ar1 decided in that way and the frequency F11 and information concerning a combination of the second range Ar2 decided in that way and the frequency F21. The reference information 306 also includes the non-reduction range Ar0. The non-reduction range Ar0 is not associated with frequencies.

FIG. 5 is a table showing information concerning combinations of the ranges of the positions of the control point and the frequencies stored in the reference information 306. The non-reduction range Ar0 can be substantially defined as a range in which an angle θ formed by a line segment connecting the control point TCP and the reference point O2 and the reference line LS is smaller than θth. A frequency to be reduced is not associated with such a range of positions (see a lower part of FIG. 5).

The first range Ar1 can be substantially defined as a range in which a distance Rtcp between the control point TCP and the reference point O2 is smaller than Rth, the range being a range in which the angle θ formed by the line segment connecting the control point TCP and the reference point O2 and the reference line LS is equal to or larger than θth. F11 is associated with such a range of positions as a frequency to be reduced (see an upper left part of FIG. 5).

The second range Ar2 can be substantially defined as a range in which the distance Rtcp between the control point TCP and the reference point O2 is equal to or larger than Rth, the range being a range in which the angle θ formed by the line segment connecting the control point TCP and the reference point O2 and the reference line LS is equal to or larger than θth. F21 is associated with such a range of positions as a frequency to be reduced (see an upper right part of FIG. 5).

In this embodiment, the control point TCP is present in the position of the distal end 170 of the arm 110 of the robot 100. Therefore, it is possible to generate the reference information 306 based on design information of the robot 100 (see S100 in FIG. 3) without requiring information concerning the end effector 200 and effectively reduce vibration of the robot 100 based on the reference information 306 (see S200 in FIG. 3).

In a form in which the reference information 306 is not generated at a stage of manufacturing the robot 100 (see S100 in FIG. 3), it cannot be specified to which degree effective vibration reduction processing is executed at a stage of the operation of the robot 100 (see S200 in FIG. 3). Therefore, in order to prevent occurrence of vibration at the stage of the operation and achieve early resolution of occurred vibration, an upper limit of moving speed and an upper limit of acceleration of the arm 110 of the robot 100 and a limit of acceleration set according to the magnitude of the mass of an object supported by the arm 110 need to be set low. Respective coefficients of a proportional element, an integral element, and a differential element of PID control performed in feedback control for the arm 110 have to be set with high stability such that vibration is easily resolved. These limitations need to be performed such that vibration can be sufficiently suppressed in a posture of the arm 110 in which vibration most easily occurs. As a result, at an operation stage of the robot 100, the arm 110 of the robot 100 moves slowly and a cycle time of operation increases.

However, in this embodiment, a manufacturer of the robot 100 can generate the reference information 306 at the stage in which the robot is manufactured (see S100 in FIG. 3). Therefore, at the stage of the operation of the robot (see S200 in FIG. 3), it can be expected that the effective vibration reduction processing using the reference information 306 is executed. Accordingly, at the stage in which the robot is manufactured (see S100 in FIG. 3), the manufacturer of the robot 100 can set the upper limit of the moving speed and the upper limit of the acceleration of the arm 110 of the robot 100 and the limit of the acceleration corresponding to the mass of the object supported by the arm 110 higher compared with the comparative example explained above. The manufacturer of the robot 100 can set the respective coefficients of the proportional element, the integral element, and the differential element of the PID control putting more importance on responsiveness. As a result, at the stage of the operation of the robot 100, it is possible to cause the arm 110 to perform high-speed movement. As a result, it is possible to reduce the cycle time of the operation.

Figure 6:
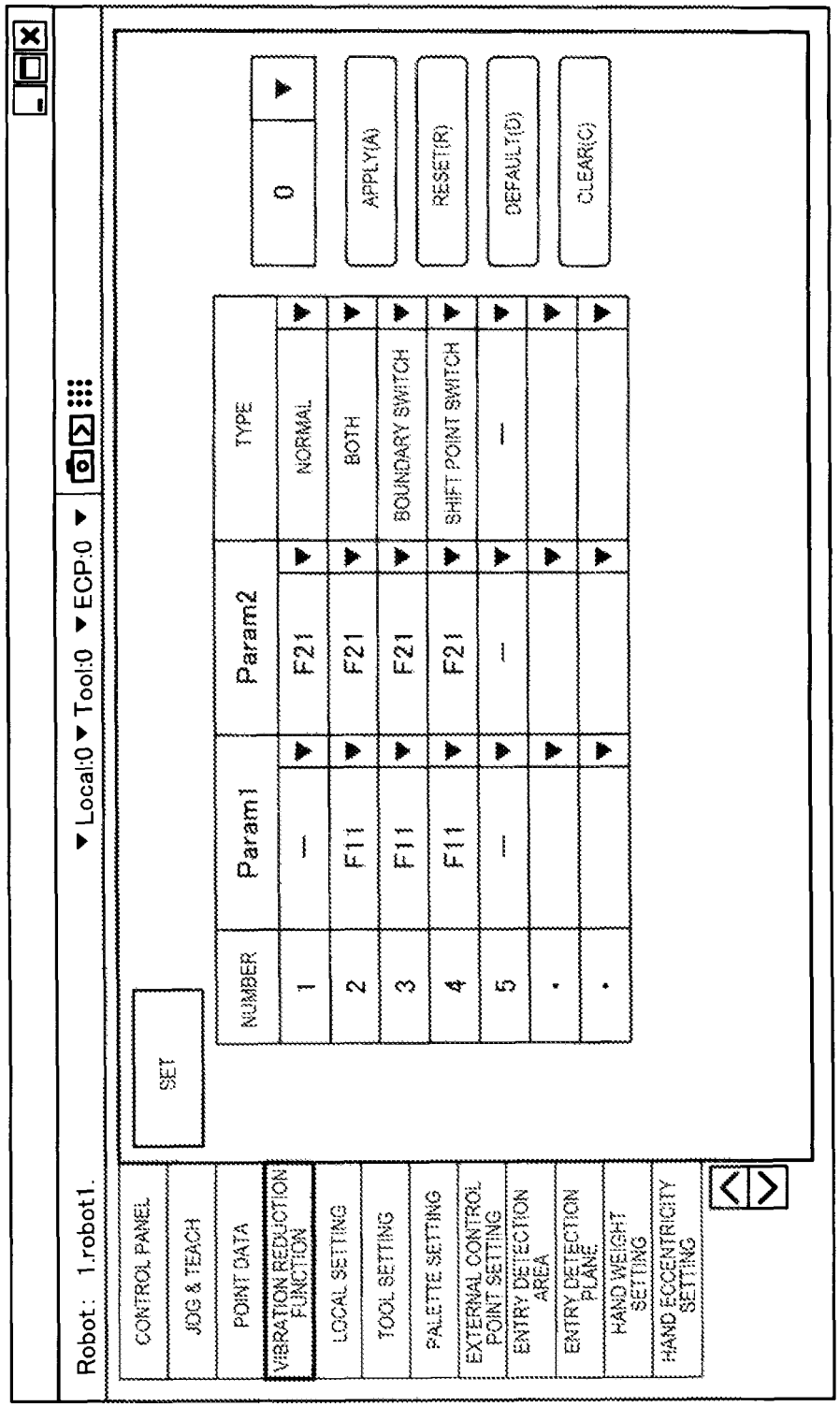
FIG. 6 is a diagram showing display on a teaching device at the time when a frequency removed from a first control signal in step S100 in FIG. 3.

FIG. 6 is a diagram showing display on the teaching device 600 at the time when contents of the vibration reduction processing are designated for respective operations in step S200 in FIG. 3. The display shown in FIG. 6 is performed on a display functioning as the output device 605 when the vibration reducing function setting is performed using the teaching device 600 functioning as a setting device for the vibration reducing function.

A row at the left end of a table shown in FIG. 6 indicates a number for distinguishing the operation. Two rows in the center of the table shown in FIG. 6 indicate parameters Param1 and Param2 representing target frequencies reduced in the vibration reduction processing. In this embodiment, maximum two target frequencies are set with respect to the operation corresponding to each of numbers. In other words, maximum two frequency components are removed from the first control signal CS1 (see 340 in FIG. 2).

A field at the right end in the table shown in FIG. 6 is a field of "type". The field of the "type" is an input interface for designating a form of reduction of vibration. In the field of the "type", one is selected out of four choices "normal", "both", "boundary switch", and "shift point switch". Content of designation by the field of the "type" is explained below. A form of reduction of vibration is determined according to the designation in the field of the "type". F11 and F21 are designated as the parameters Param1 and Param2 representing one or two target frequencies. F11 and F21 are stored in association with the position of the control point in the reference information 306 (see FIGS. 1 and 5).

For example, it is assumed that, on another setting screen, operation Op10 is allocated to a number 1 in the table shown in FIG. 6. The operation Op10 is operation in which the control point moves from a position P11 in the first range Ar1 to a position P12 in the second range Ar2 (see a middle right part in FIG. 4). In the operation Op10, the position of the control point TCP located in the boundary between the first range Ar1 and the second range Ar2 is shown as position P13. In the operation Op10, the control point TCP moves at constant speed in front of and behind the position P13.

When the field of the "type" is set to the "normal", the filter setting section 345 (see FIG. 2) determines, as a frequency to be reduced in the vibration reduction processing, a frequency associated with a range of positions to which an endpoint of operation belongs. As a result, for the operation Op10 associated with the number 1 in the table shown in FIG. 6, the filter processing section 340 (see FIG. 2) reduces, from the first control signal CS1 for instructing the operation Op10, a component of the frequency F21 associated with the second range Ar2 in the reference information 306 and generates the second control signal CS2 (see Param2 in the field having the number 1 shown in FIG. 6). The field of the "type" in FIG. 6 is set to the "normal" in default.

By performing such processing, it is possible to generate the second control signal CS2 that can effectively reduce residual vibration after the end of the operation Op10 instructed by the first control signal CS1.

It is assumed that, on another setting screen, the operation Op10 is allocated to a number 2 in the table shown in FIG. 6. Actually, different operations are associated with the respective numbers shown in FIG. 6. However, to facilitate understanding of the technique, it is assumed that the operation Op10 is also allocated to the number 2 in the table shown in FIG. 6. The same applies to a number 3 explained below.

When the field of the "type" is set to the "both", the filter setting section 345 (see FIG. 2) determines, as the frequency to be reduced in the vibration reduction processing, the frequency associated with the range of the positions to which the end point of the operation belongs and a frequency associated with a range of positions to which a start point of the operation belongs. As a result, for the operation Op10 associated with the number 2 in the table shown in FIG. 6, the filter processing section 340 (see FIG. 2) reduces, from the first control signal CS1 for instructing the operation Op10, a component of the frequency F21 associate with the second range Ar2 in the reference information 306 and a component of the frequency F11 associated with the first range Ar1 in the reference information 306 and generates the second control signal CS2 (see Param1 and Param2 in the field having the number 2 shown in FIG. 6).

By performing such processing, it is possible to generate the second control signal CS2 that can suppress vibration of the control point TCP at the time when the control point TCP is moving in the second range Ar2 and after the operation end and, in addition, effectively reduce vibration of the control point TCP at the time when the control point TCP is moving in the first range Ar1 (see Op11 in FIG. 4).

It is assumed that, on another setting screen, the operation Op10 is allocated to a number 3 in the table shown in FIG. 6.

When the field of the "type" is set to the "boundary switch", the filter setting section 345 (see FIG. 2) determines, as the frequency to be reduced in the vibration reduction processing, the frequency associated with the range of the positions to which the end point of the operation belongs and the frequency associated with the range of the positions to which the start point of the operation belongs. For a portion for instructing a first partial operation Op11 in which the control point TCP moves in the first range Ar1, the frequency to be reduced is set to the frequency F11 associated with the first range Ar1 to which a start point P11 of the operation belongs. For a portion for instructing a second partial operation Op12 in which the control point TCP moves in the second range Ar2, the frequency to be reduced is set to the frequency F21 associated with the second range Ar2 to which an end point P12 of the operation belongs.

As a result, for the operation Op10 associated with the number 3 in the table shown in FIG. 6, the filter processing section 340 (see FIG. 2) performs the following processing when generating the second control signal CS2 from the first control signal CS1 for instructing the operation Op10. The filter processing section 340 reduces, in the first control signal CS1, for a portion for instructing the first partial operation Op11 in which the control point TCP moves in the first range Ar1, the component of the frequency F11 associated with the first range Ar1 in the reference information 306. The filter processing section 340 reduces, in the first control signal CS1, for a portion for instructing the second partial operation Op12 in which the control point TCP moves in the second range Ar2, the component of the frequency F21 associated with the second range Ar2 in the reference information 306.

By performing such processing, the following effects are obtained compared with a form for consistently reducing both of the component of the frequency F11 associated with the first range Ar1 and the component of the frequency F21 associated with the second range Ar2 (see the field having the number 2 in the table shown in FIG. 6). For the first partial operation Op11 in the operation instructed by the first control signal CS1, it is possible to effectively reduce vibration while reducing positional deviation. For the second partial operation Op12, it is also possible to effectively reduce vibration.

It is assumed that, in another setting screen, operation Op20 is allocated to a number 4 in the table shown in FIG. 6. The operation Op20 is operation in which the control point TCP moves from a position P21 in the first range Ar1 to a position P22 in the second range Ar2 (see an upper right part of FIG. 4). However, in the operation Op20, the control point TCP moves while changing speed in a predetermined change point P23 in the second range Ar2. In the explanation of the filter setting section 345 and the filter processing section 340 in this specification, "speed" is a concept including magnitude and a direction. In other words, a change in which the magnitude is the same and the direction changes is also included in a change in the speed.

When the field of the "type" is set to the "shift point switch", the filter setting section 345 (see FIG. 2) determines, as the frequency to be reduced in the vibration reduction processing, the frequency associated with the range of the positions to which the end point of the operation belongs and the frequency associated with the range of the positions to which the start point of the operation belongs. For a portion before the control point TCP reaches the change point P23, the frequency to be reduced is set to the frequency associated with the range of the positions to which the start point of the operation belongs. For a portion after the control point TCP reaches the change point P23, the frequency to be reduced is set to the frequency associated with the range of the positions to which the end point of the operation belongs.

As a result, for the operation Op20 associated with the number 4 in the table shown in FIG. 6, the filter processing section 340 (see FIG. 2) performs the following processing when the second control signal CS2 is generated from the first control signal CS1 for instructing the operation Op20. In the first control signal CS1, for a portion for instructing a first partial operation Op21, which is operation before the control point TCP reaches the change point P23, the filter processing section 340 reduces the component of the frequency F11 associated with the first range Ar1 in the reference information 306. In the first control signal CS1, for a portion for instructing a second partial operation Op22, which is operation after the control point TCP reaches the change point P23, the filter processing section 340 reduces the component of the frequency F21 associated with the second range Ar2 in the reference information 306.

By performing such processing, the following effects are obtained compared with the form for consistently reducing both of the component of the frequency F11 associated with the first range Ar1 and the component of the frequency F21 associated with the second range Ar2 (see the number 2 in the table shown in FIG. 6). For the first partial operation Op21 in the operation instructed by the first control signal CS1, it is possible to effectively reduce vibration while reducing positional deviation. For the second partial operation Op22, it is also possible to effectively reduce vibration.

It is assumed that, in another setting screen, operation Op30 is allocated to a number 5 in the table shown in FIG. 6. The operation Op30 is operation in which the control point TCP moves in the non-reduction range Ar0. More specifically, the operation Op30 is operation in which the control point TCP moves from a position P31 in the first range Ar1 to a position P32 in the non-reduction range Ar0 (see a lower right part of FIG. 4). In the operation Op30, the position of the control point TCP located in the boundary between the first range Ar1 and the non-reduction range Ar0 is shown as a position P33.

When operation having a certain number is the operation Op30 in which the control point TCP moves in the non-reduction range Ar0, the field of the "type" cannot be set for a row having the number. For the operation Op30 in which the control point TCP moves in the non-reduction range Ar0, the filter setting section 345 (see FIG. 2) does not determine the frequency to be reduced in the vibration reduction processing. As a result, for the operation Op30 associated with the number 5 in the table shown in FIG. 6, the filter processing section 340 (see FIG. 2) generates the second control signal CS2 without reducing a frequency component from the first control signal CS1 for instructing the operation Op30.

By performing such processing, even for operation in which the control point TCP is present in any position range, it is possible to improve position accuracy in operation in which the control point TCP moves in the non-reduction range Ar0 compared with a form for reducing a frequency component from the first control signal CS1.

In this embodiment, the non-reduction range Ar0 is a range including the base 180 supporting the arm 110 (see FIG. 4). Therefore, the arm 110 is folded and has high rigidity as a structure. As a result, the following effects are obtained for the operation Op30 considered to comparatively less easily vibrate. It is possible to improve position accuracy without suffering a disadvantage due to vibration or with a smaller disadvantage.

According to this embodiment, it is possible to, without measuring a resonance frequency of the robot 100 for operation taught anew, generate, for the operation, the driving signal DS, which can reduce vibration, based on the reference information 306 and output the driving signal DS to the robot 100. Therefore, it is possible to reduce a burden on the user when reducing vibration for a plurality of operations compared with a control device that does not generate the second control signal CS2 using the reference information 306 in which information concerning combinations of the ranges AR1 and Ar2 of the positions of the control point TCP of the robot 100 and the frequencies F11 and F21 is stored.

The arm 110 in this embodiment is referred to as "movable section" as well. The filter processing section 340 and the filter setting section 345 are referred to as "second-control-signal generating section" as well.

The step of generating the reference information 306 in step S100 in this embodiment is referred to as "step (a)" as well (see FIG. 3). The step of determining a frequency component to be reduced from the first control signal CS1 in step S200 is referred to as "step (b)" as well. The step of performing, on the first control signal CS1, processing for removing a frequency component and generating the second control signal CS2 in step S200 is referred to as "step (c)" as well. The step of moving the arm 110 based on the second control signal CS2 in step S200 is referred to as "step (d)" as well.

B. Second Embodiment

In a second embodiment, a method of determining a frequency to be reduced in the vibration reduction processing in step S200 in FIG. 3 is different from the method in the first embodiment. Specifically, the frequency to be reduced in the vibration reduction processing is corrected considering the mass of an object supported at the distal end 170 by the arm 110 in operation. Otherwise, the second embodiment is the same as the first embodiment.

Figure 7:
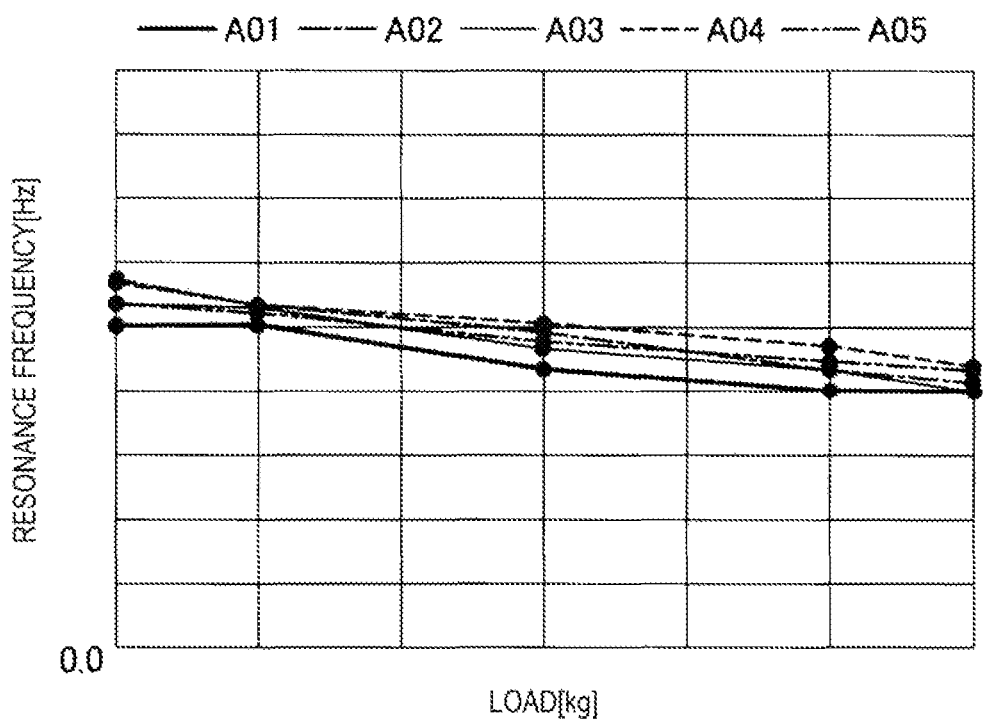
FIG. 7 is a graph showing changes in resonance frequencies corresponding to the mass of an object supported at a distal end by an arm in operation.
Figure 8:
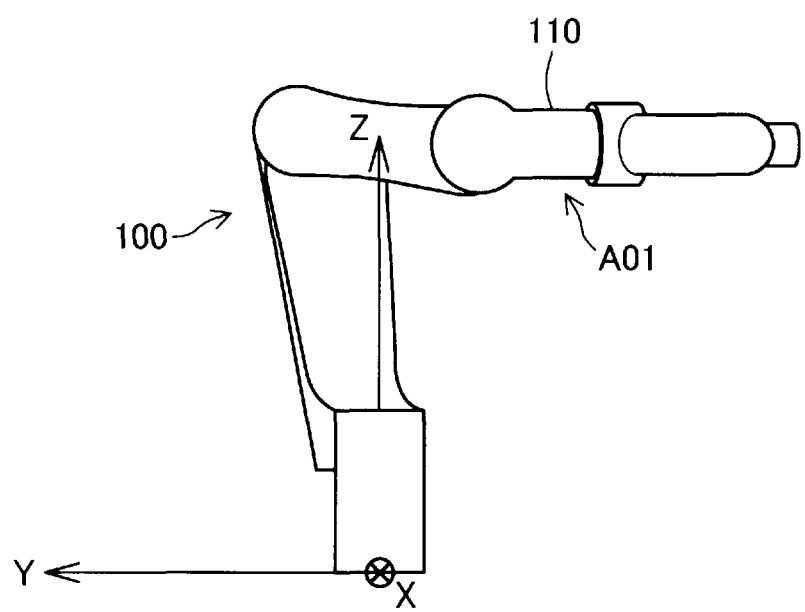
FIG. 8 is a diagram showing a posture of the robot.
Figure 9:
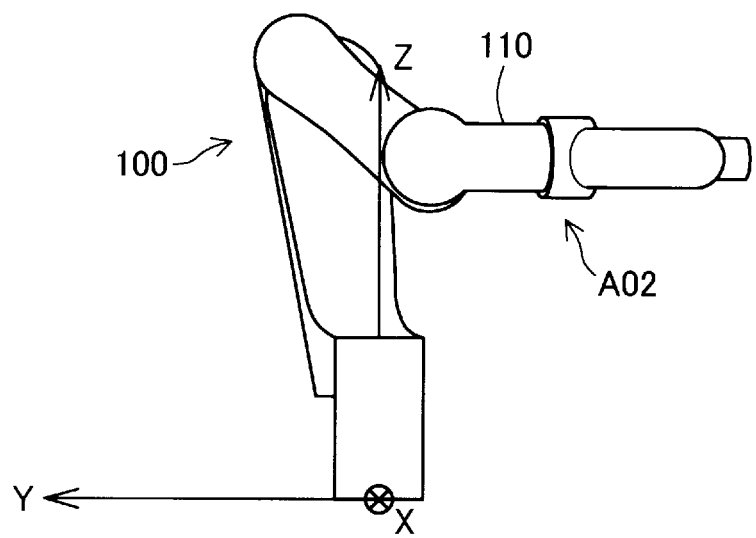
FIG. 9 is a diagram showing a posture of the robot.
Figure 10:
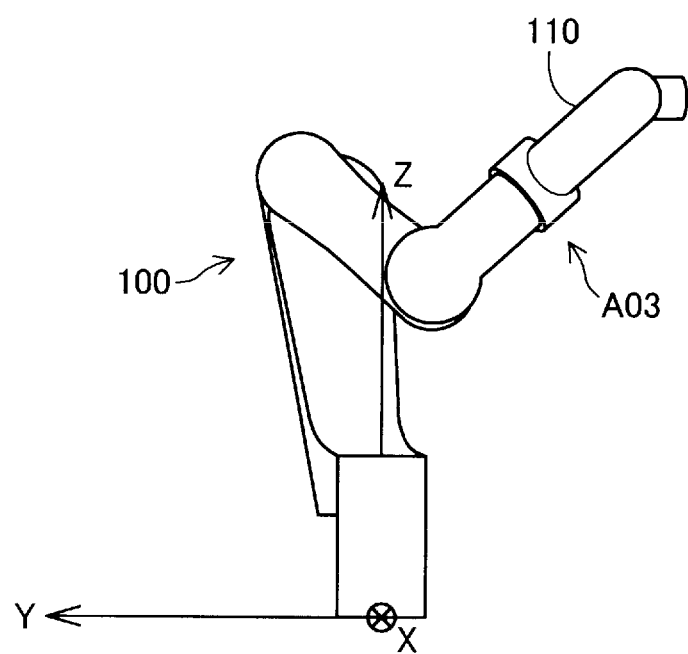
FIG. 10 is a diagram showing a posture of the robot.
Figure 11:
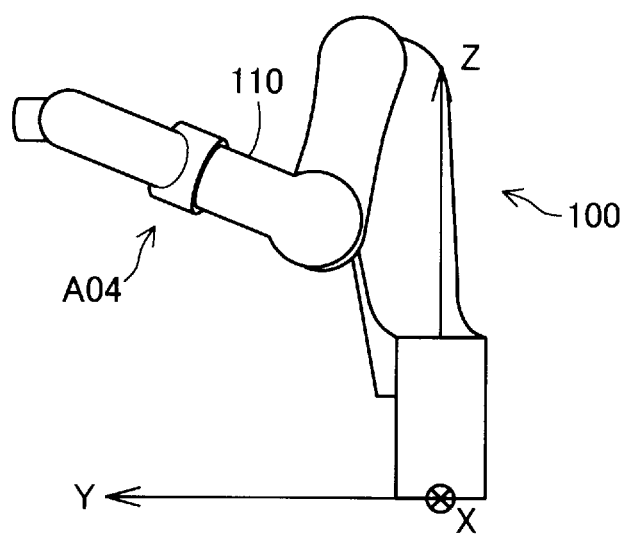
FIG. 11 is a diagram showing a posture of the robot.
Figure 12:
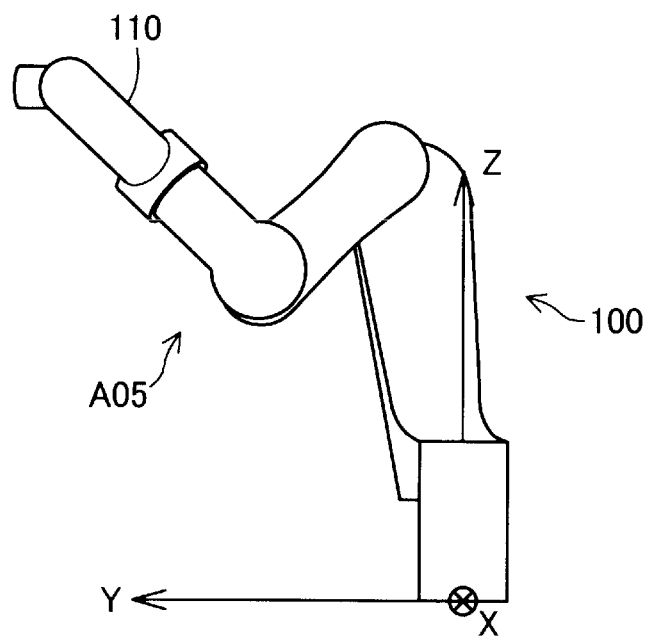
FIG. 12 is a diagram showing a posture of the robot.

FIG. 7 is a graph showing changes in resonance frequencies corresponding to the mass of an object supported at the distal end 170 by the arm 110 in operation. FIGS. 8 to 12 are diagrams respectively showing postures A01 to A05 of the robot 100. In FIG. 7, a thick solid line is a graph showing a change in a resonance frequency corresponding to the mass of the object supported at the distal end 170 by the arm 110 at the time when the robot 100 takes the posture A01. An alternate long and short dash line is a graph showing a change in a resonance frequency corresponding to the mass of the object supported at the distal end 170 by the arm 110 at the time when the robot 100 takes the posture A02. A thin solid line is a graph showing a change in a resonance frequency corresponding to the mass of the object supported at the distal end 170 by the arm 110 at the time when the robot 100 takes the posture A03. A broken line is a graph showing a change in a resonance frequency corresponding to the mass of the object supported at the distal end 170 by the arm 110 at the time when the robot 100 takes the posture A04. An alternate long and two short dashes line is a graph showing a change in a resonance frequency corresponding to the mass of the object supported at the distal end 170 by the arm 110 at the time when the robot 100 takes the posture A05.

It is seen from FIG. 7 that, in all the postures, the resonance frequencies are smaller as the mass of the object supported at the distal end 170 by the arm 110 is larger. It is seen that ratios of decreases in the resonance frequencies to increases in the payload are substantially constant. In measurement shown in FIG. 7, the mass of the object supported at the distal end 170 by the arm 110 includes the mass of the end effector 200 and the mass of the workpiece W01 held by the end effector 200.

In the second embodiment, the filter setting section 345 (see FIG. 2) determines, based on information concerning the mass of the object supported at the distal end 170 by the arm 110, a frequency to be reduced from the first control signal CS1 such that the frequency to be reduced from the first control signal CS1 is smaller as the mass is larger. More specifically, the filter setting section 345 corrects a frequency obtained with reference to the reference information 306 (see FIGS. 1 and 5) to linearly decrease with respect to an increase in the mass of the supported object. The information concerning the mass of the object supported at the distal end 170 by the arm 110 is input to the robot control device 300 in advance when the operation is determined in step S200 in FIG. 3.

The filter processing section 340 receives, from the filter setting section 345, a control signal for one or more frequency components to be removed, performs processing for removing the frequency component, and generates a new torque control signal (see FIG. 2). As a result, the first control signal CS1 is corrected such that a frequency component to be reduced from the first control signal CS1 is smaller as the mass of the object supported at the distal end 170 by the arm 110 is larger. The second control signal CS2 is generated.

By performing such processing, it is possible to reduce vibration of the operation of the robot 100 at a higher degree compared with a form for determining, without considering the mass of an object supported at the distal end by the arm 110, a component of a frequency to be reduced from the first control signal CS1.

C. Third Embodiment

Figure 13:
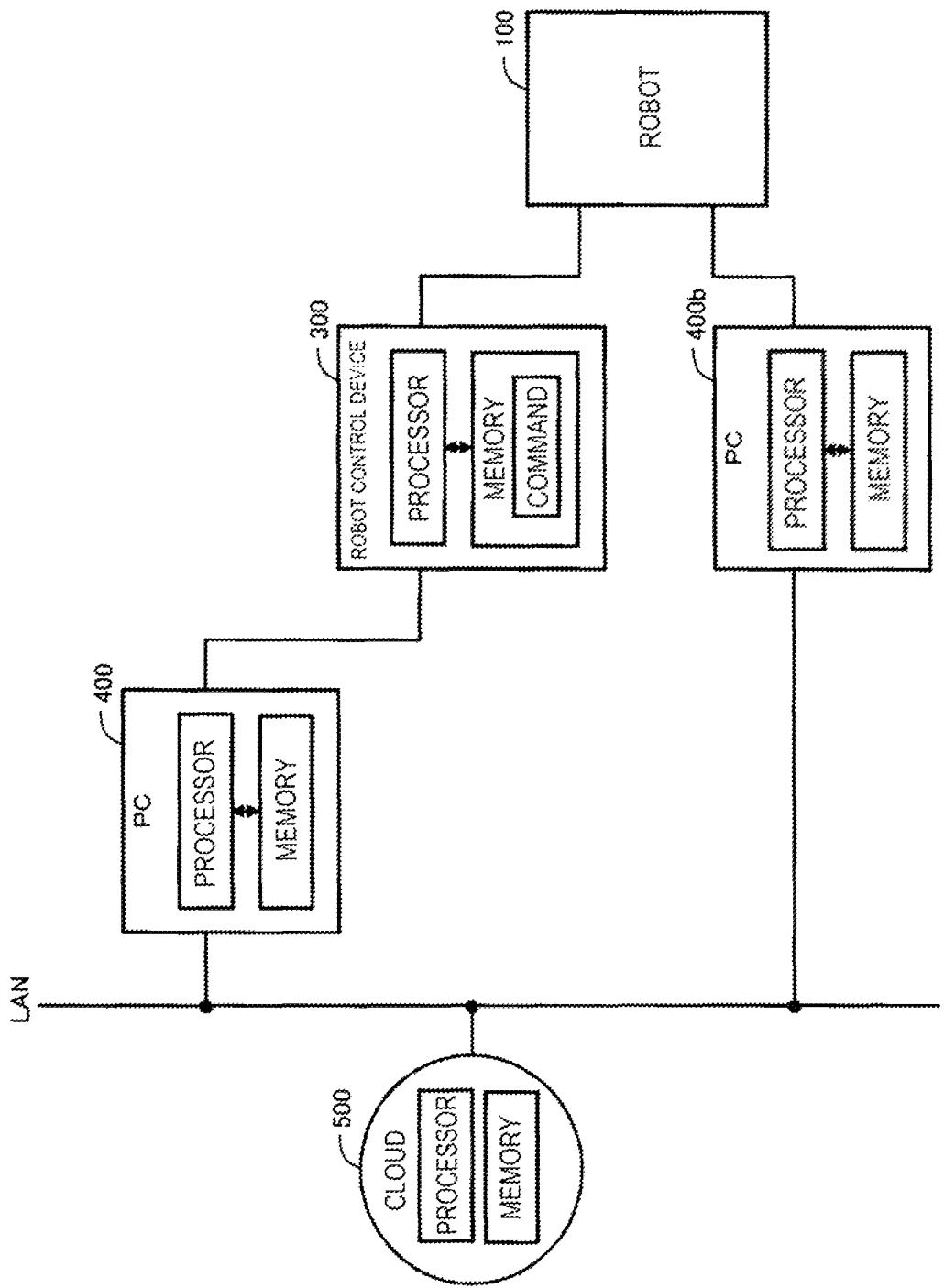
FIG. 13 is a conceptual diagram showing an example in which a control device for a robot is configured by a plurality of processors.

FIG. 13 is a conceptual diagram showing an example in which a control device for a robot is configured by a plurality of processors. In this example, besides the robot 100 and the robot control device 300 for the robot 100, personal computers 400 and 400b and a cloud service 500 provided via a network environment such as a LAN are drawn. The personal computers 400 and 400b respectively include processors and memories. A processor and a memory are usable in the cloud service 500 as well. The processors execute computer-executable commands. It is possible to realize, using a part or all of these plurality of processors, a control device including the robot control device 300 and the teaching device 600. It is also possible to realize, using a part or all of these plurality of memories, a storing section that stores various kinds of information.

D. Fourth Embodiment

Figure 14:
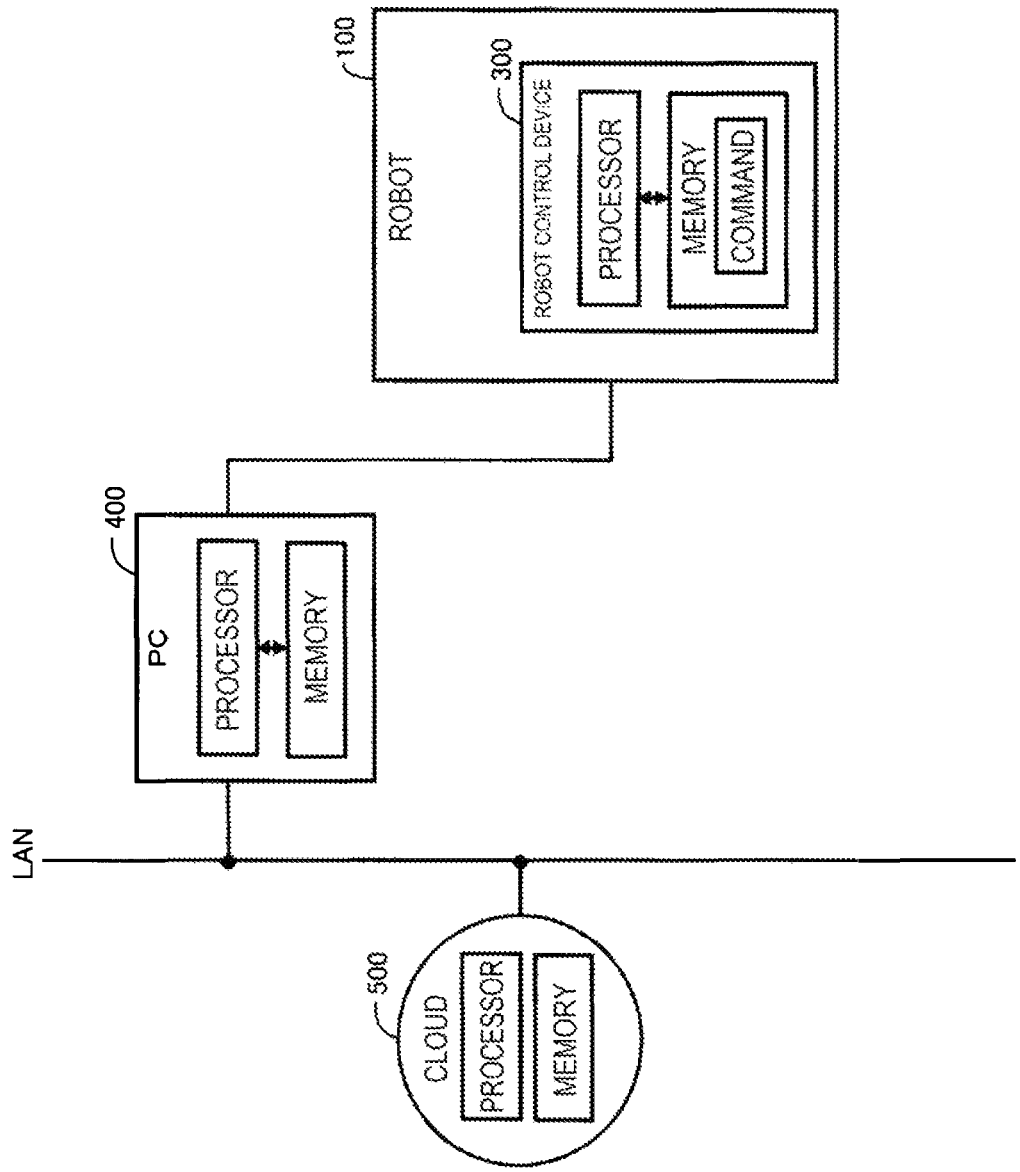
FIG. 14 is a conceptual diagram showing another example in which the control device for the robot is configured by the plurality of processors.

FIG. 14 is a conceptual diagram showing another example in which the control device for the robot is configured by the plurality of processors. This example is different from the example shown in FIG. 13 in that the robot control device 300 of the robot 100 is housed in the robot 100. In this example as well, it is possible to realize a control device for the robot 100 using a part or all of a plurality of processors. It is also possible to realize, using apart or all of a plurality of memories, a storing section that stores various kinds of information.

E. Other Embodiments

The present disclosure is not limited to the embodiments explained above and can be realized in various aspects in a range not departing from the gist of the present disclosure. For example, the present disclosure can also be realized by the following aspects. The technical features in the embodiments corresponding to technical features in the aspects explained below can be substituted or combined as appropriate in order to solve a part or all of the problems of the present disclosure or achieve a part or all of the effects of the present disclosure. Unless the technical features are explained as essential technical features in this specification, the technical features can be deleted as appropriate.

E1. Another Aspect 1

(1) In the embodiments explained above, the ranges Ar0, Ar1, and Ar2 of the positions are decided with the position of the joint X12 set as the reference point O2 (see FIG. 4). However, the range of the positions associated with the frequencies to be reduced in the reference information can also be decided with another point set as a reference. The range of the positions associated with the frequencies to be reduced in the reference information is desirably a range centering on the position of the bending joint closest to the base supporting the arm functioning as the movable section in the robot. By adopting such a form, it is possible to effectively reduce vibrations having various natural frequencies that occur in the arm compared with a form in which the position of a joint closer to the distal end of the arm is set as the reference point.

In the embodiments, the range of the positions associated with the frequencies to be reduced in the reference information is decided without considering an angle position in the joint X11 closest to the base 180 (see FIG. 4). However, since the joint X11 closest to the base 180 is the torsion joint, the influence of the angle position in the joint X11 on the resonance of the arm 110 is not large. Therefore, it is possible to substantially reduce the vibration of the arm 110 of the robot 100 by deciding, based on the position of the bending joint closest to the base supporting the arm functioning as the movable section in the robot, the range of the positions associated with the frequencies to be reduced.

When the robot 100 is suspended from a stand and operated, it is desirable to, considering an angle position in a torsion joint closer to the base than the bending joint closest to the base, decide measurement positions for resonance frequencies (see FIG. 4) and decide the range of the positions associated with the frequencies to be reduced. It is also possible to generate the reference information in advance in the manufacturing stage of the robot (see S100 in FIG. 3) as in the embodiments and further measure a resonance frequency at the stage when the robot is set (see S200 in FIG. 3) and generate additional reference information.

In the embodiments, the frequencies to be reduced is decided according to the positions of the control point TCP (see FIGS. 4 and 5). The posture of the arm 110 for the joints X13 to X16 is not considered in the determination of the frequencies to be reduced performed with reference to the reference information. However, the influence of a relative position of the control point TCP with respect to the reference point on the vibration of the arm 110 is extremely large compared with the influence of the posture of the arm 110 for the joints X13 to X16 on the vibration of the arm 110. Therefore, it is possible to substantially reduce the vibration of the arm 110 of the robot 100 by deciding, based on the relative positions of the control point and the reference point, the range of the positions associated with the frequencies to be reduced.

(2) In the embodiments, the measurement of a resonance frequency is performed using the acceleration sensors for six axes attached to the distal end 170 of the arm 110 (see FIG. 4). However, the measurement of a resonance frequency may be performed using a force sensor attached to the arm.

(3) In the embodiments, the non-reduction range Ar0 is the space having the conical shape (see FIGS. 4 and 5). The first range Ar1 is the space obtained by excluding the non-reduction range Ar0 from the spherical space centering on the reference point O2. The second range Ar2 is the space other than the non-reduction range Ar0 and the first range Ar1.

However, in the reference information, the spaces associated with the frequencies to be reduced may have other shapes. The number of spaces associated with the frequencies to be reduced may be three or more. The spaces associated with the frequencies to be reduced may be decided in a polar coordinate system based on the Z axis of the robot coordinate system. The spaces associated with the frequencies to be reduced is desirably decided according to the distance from the reference point set in the bending joint closest to the base among the plurality of joints included in the robot. The spaces associated with the frequencies to be reduced desirably do not overlap one another.

(4) In the embodiments, rotating shafts are supported only at one ends in the bending joints X12, X13, and X15 of the robot 100 (see FIG. 1). In such a form, vibration easily occurs because the rigidity of the joints is low compared with a form in which the rotating shafts are supported at both ends. Therefore, the technique of the present disclosure is particularly effective in a robot in which rotating shafts of joints are supported only at one ends. Effective effects are also obtained when the technique of the present disclosure is applied to a robot in which rotating shafts of joints are supported at both ends.

(5) In the embodiments, the robot 100 is a vertical articulated robot (see FIG. 1). However, the technique of the present disclosure can also be applied to a so-called SCARA robot.

(6) In the form explained in the embodiments, in the vibration reduction processing, only the frequencies F11 and F21 decided with reference to the reference information 306 and the frequency components before and after the frequencies F11 and F21 are reduced (see FIG. 6). However, in the vibration reduction processing, other frequency components can be reduced in addition to the frequencies decided with reference to the reference information and the frequency components before and after the frequencies. For example, the other frequency components to be reduced can be decided based on a resonance frequency obtained by measuring a resonance frequency after the end effector is attached to the arm of the robot.

Processing for reducing the frequencies decided with reference to the reference information and processing for reducing the frequencies decided by the other method may be executed in different operations or may be executed in the same operation, may be executed in parallel, or may be executed one after the other.

E2. Another Aspect 2

In the embodiments, the control point TCP is present at the distal end 170 of the arm 110 of the robot 100 (see FIG. 1). However, the control point of the robot can also be arranged in a position deviating from the distal end of the arm functioning as the movable section, for example, a position deviating to the base side from the distal end of the arm.

E3. Another Aspect 3

In the embodiments, the frequency components in the range of the frequencies F11 and F21±Δf are reduced. Δf is 1 Hz. However, the width of frequencies before and after a specific frequency reduced together with components of the specific frequency may be other values such as 0.5 Hz and 2 Hz. The width of the frequencies before and after the specific frequency reduced together with the components of the specific frequency may be different for each of the components of the specific frequency.

E4. Another Aspect 4

In the embodiments, when the field of the "type" is set to the "normal", the filter setting section 345 (see FIG. 2) determines, as the frequencies to be reduced in the vibration reduction processing, the frequencies associated with the range of the positions to which the endpoint of the operation belongs (see the number 1 in FIG. 6). The field of the "type" is set to the "normal" in default. However, a form can also be adopted in which the frequencies associated with the range of the positions to which the endpoint of the operation belongs is not set as default of the frequencies to be reduced in the vibration reduction processing. A form can also be adopted in which, as the frequencies to be reduced in the vibration reduction processing, the frequencies associated with the range of the positions to which the endpoint of the operation belongs are not determined and other frequencies are determined. For example, only the frequencies associated with the range of the positions to which the start point of the operation belongs may be determined as the frequencies to be reduced in the vibration reduction processing. Only the frequencies associated with the range of the positions to which the change point where speed is changed belongs may be determined as the frequencies to be reduced in the vibration reduction processing.

E5. Another Aspect 5

In the embodiments, the filter processing section 340 (see FIG. 2) reduces, from the first control signal CS1 for instructing the operation Op10, the component of the frequency F21 associated with the second range Ar2 in the reference information 306 and the component of the frequency F11 associated with the first range Ar1 in the reference information 306 and generates the second control signal CS2 (see Param1 and Param2 in the field having the number 2 in FIG. 2).

For example, when certain operation passes in three or more ranges of positions, a form can also be adopted in which it is possible to select frequencies associated with which range of positions among the ranges should be reduced in the vibration reduction processing. In the vibration reduction processing, it is undesirable to reduce four or more frequency components because a position deviation becomes large.

E6. Another Aspect 6

(1) In the embodiments, when the field of the "type" is set to the "boundary switch", the filter processing section 340 reduces, in the first control signal CS1, for a portion for instructing the first partial operation Op11 in which the control point TCP moves in the first range Ar1, the component of the frequency F11 associated with the first range Ar1 in the reference information 306 (see FIGS. 4 and 6). The filter processing section 340 reduces, in the first control signal CS1, for a portion for instructing the second partial operation Op12 in which the control point TCP moves in the second range Ar2, the component of the frequency F21 associated with the second range Ar2 in the reference information 306. Such switching in the boundary of the range of the positions can also be executed when certain operation passes three or more ranges of positions.

For the operation Op30 in which the control point TCP moves from the position P31 in the first range Ar1 to the position P32 in the non-reduction range Ar0, it is also possible to switch, according to the ranges Ar1 and Ar0 of the positions where the control point is located, processing for reducing the component of the frequency F11 associated with the first range Ar1 and processing for not reducing a component of a frequency.

When switching a frequency to be reduced, it is desirable to reduce a ratio for reducing the frequency and increase a ratio for reducing a new frequency to gradually perform the switching.

(2) In the embodiments, in the field of the "type", one is selected out of the four choices of the "normal", the "both", the "boundary switch", and the "shift point switch". However, the technique of the present disclosure can also be applied as a control device that cannot perform such selection and performs only processing corresponding to any one of the "normal", the "both", the "boundary switch", and the "shift point switch".

E7. Another Aspect 7

(1) In the embodiments, when the field of the "type" is set to the "shift point switch", the filter processing section 340 reduces, in the first control signal CS1, for the portion for instructing the first partial operation Op21, which is the operation before the control point TCP reaches the change point P23, the component of the frequency F11 associated with the first range Ar1 in the reference information 306. The filter processing section 340 reduces, in the first control signal CS1, for the portion for instructing the second partial operation Op22, which is the operation after the control point TCP reaches the change point P23, the component of the frequency F21 associated with the second range Ar2 in the reference information 306. The change point P23 is present in the second range Ar2.

However, the processing can also be performed when the change point P23 is present in the first range Ar1 rather than the second range Ar2.

(2) In the embodiments, the change point where the speed of the control point is changed is one point P23 in the operation Op20 (see FIG. 4). However, a plurality of change points may be included in one operation. In the operation including the change point, the frequency associated with the range of the positions to which the change point belongs may be reduced or the frequency associated with the range of the positions to which the end point of the operation belongs may be reduced in the vibration reduction processing for the operation after the change point.

E8. Another Aspect 8

In the embodiments, the operation Op30 is the operation in which the control point TCP moves from the position P31 in the first range Ar1 to the position P32 in the non-reduction range Ar0 (see the lower right part of FIG. 4). In this way, the operation for not performing the vibration reduction processing using the reference information may be, like the operation Op30, operation passing the non-reduction range in a part of the operation. The operation for not performing the vibration reduction processing using the reference information may be operation in which the control point moves only in the non-reduction range.

E9. Another Aspect 9

In the embodiments, the base 180 is included in the non-reduction range Ar0 (see FIG. 4). However, the non-reduction range, which is the range of the positions of the control point of the robot not associated with frequencies, can also be a range not including a part of the base or can also be a range not including the entire base. Reference information not including the non-reduction range can also be created.

E10. Another Aspect 10

In the second embodiment, the filter setting section 345 corrects the frequency obtained with reference to the reference information 306 (see FIGS. 1 and 5) to linearly decrease with respect to an increase in the mass of the supported object (see FIG. 7). However, the frequency obtained with reference to the reference information can also be corrected by another method of, for example, correcting the frequency in a quadratic curve manner convex upward or downward.

The mass to be considered can include the mass of a sensor, a tool, and a monitor attached to the arm 110 besides the mass of the workpiece W01 held by the end effector 200. When the frequencies obtained with reference to the reference information and the mass are corrected, for example, it is desirable to change a coefficient for the mass according to positions to which the objects are attached and correct the frequencies based on a weighted sum.

F. Still Other Aspects

The present disclosure is not limited to the embodiments explained above and can be realized in various aspects in a range not departing from the gist of the present disclosure. For example, the present disclosure can also be realized by the following aspects. The technical features in the embodiments corresponding to technical features in the aspects explained below can be substituted or combined as appropriate in order to solve a part or all of the problems of the present disclosure or achieve a part or all of the effects of the present disclosure. Unless the technical features are explained as essential technical features in this specification, the technical features can be deleted as appropriate.

(1) According to an aspect of the present disclosure, a control device for controlling a robot is provided. The control device includes: a second-control-signal generating section configured to reduce a predetermined frequency component from a first control signal for performing operation for moving a movable section of the robot to generate a second control signal; and a storing section having stored therein reference information including information concerning combinations of ranges of positions of a control point of the robot and frequencies. The second-control-signal generating section determines, based on a position of the control point of the robot in the operation, with reference to the reference information, a frequency component to be reduced from the first control signal.

With such a form, it is possible to generate, without measuring, for operation taught anew, a resonance frequency of the robot, a driving signal which can reduce vibration, for the operation and output the driving signal to the robot. Therefore, it is possible to reduce a burden on the user in reducing vibration for a plurality of operations compared with a control device that does not generate the second control signal using the reference information including information concerning the combinations of the ranges of the positions of the control point of the robot and the frequency components.

(2) In the control device according to the aspect, the control point may be present at, of both ends of the movable section, an opposite end of an end coupled to a base supporting the movable section.

With such a form, it is possible to generate the reference information based on design information of the robot and effectively reduce vibration of the robot based on the reference information.

(3) In the control device according to the aspect, the second-control-signal generating section may reduce, from the first control signal, components in a range of frequencies in predetermined width including the determined frequency and generate the second control signal, the reference information may include information concerning two or more combinations of the ranges of the positions of the control point of the robot and the frequencies, and, in the reference information, ranges of any two of the positions may be set such that the ranges of the frequencies including the frequencies associated with the respective positions do not overlap each other.

With such a form, compared with a form in which the ranges of the frequencies reduced by the second-control-signal generating section overlap, it is possible to generate the reference information such that, for a range of frequencies that can be resonance frequencies, vibration can be efficiently reduced by division of a smaller number of ranges of positions.

(4) In the control device according to the aspect, the reference information may include information concerning a first range, which is a range of positions associated with frequencies, and a second range, which is a range of positions associated with frequencies and is different from the first range, and the second-control-signal generating section may reduce, from the first control signal for instructing operation in which the control point moves from a position in the first range to a position in the second range, a frequency component associated with the second range in the reference information and generate the second control signal.

With such a form, it is possible to generate the second control signal that can effectively reduce residual vibration after an end of the operation instructed by the first control signal.

(5) In the control device according to the aspect, the second-control-signal generating section may further reduce, from the first control signal, a frequency component associated with the first range in the reference information and generate the second control signal.

With such a form, it is possible to generate the second control signal that can further effectively reduce vibration of the control point moving in the first range.

(6) In the control device according to the aspect, the reference information may include information concerning a first range, which is a range of positions associated with frequencies, and a second range, which is a range of positions associated with frequencies and is different from the first range, and the second-control-signal generating section may reduce, from the first control signal for instructing operation in which the control point moves from a position in the first range to a position in the second range, in generating the second control signal, in the first control signal, for a portion for instructing a first partial operation in which the control point moves in the first range, a frequency component associated with the first range in the reference information and reduce, in the first control signal, for a portion for instructing a second partial operation in which the control point moves in the second range, a frequency component associated with the second range in the reference information.

With such a form, compared with a form for consistently reducing both of the frequency component associated with the first range and the frequency component associated with the second range, it is possible to, while reducing positional deviation, effectively reduce vibration for the first partial operation in the operation instructed by the first control signal. It is possible to effectively reduce vibration for the second partial operation as well.

(7) In the control device according to the aspect, the reference information may include information concerning a first range, which is a range of positions associated with frequencies, and a second range, which is a range of positions associated with frequencies and is different from the first range, and the second-control-signal generating section may reduce, from the first control signal for instructing operation in which the control point moves from a position in the first range to a position in the second range and in which the control point moves while changing speed of the control point at a predetermined change point in the second range, in generating the second control signal, in the first control signal, for a portion for instructing a first partial operation, which is operation before the control point reaches the change point, a frequency component associated with the first range in the reference information and reduce, in the first control signal, for a portion for instructing a second partial operation, which is operation after the control point reaches the change point, a frequency component associated with the second range in the reference information.

With such a form, compared with a form for consistently reducing both of the frequency component associated with the first range and the frequency component associated with the second range, it is possible to, while reducing positional deviation, effectively reduce vibration for the first partial operation in the operation instructed by the first control signal. It is possible to effectively reduce vibration for the second partial operation as well.

(8) In the control device according to the aspect, the reference information may further include information concerning a non-reduction range, which is a range of positions of the control point of the robot not associated with frequencies, and the second-control-signal generating section may be able to generate the second control signal without reducing a frequency component from the first control signal for instructing operation in which the control point moves in the non-reduction range.

With such a form, compared with a form for reducing, for operation in which the control point is present in any position range, a frequency component from the first control signal, it is possible to improve position accuracy in the operation in which the control point moves in the non-reduction range.

(9) In the control device according to the aspect, the non-reduction range may be a range including at least a part of a base supporting the movable section.

In such a form, the control point is present near the base supporting the movable section. The second control signal is generated without a frequency component being reduced from the first control signal for operation in which the movable section takes a folded posture. Therefore, for operation in which the movable section is folded and less easily vibrates, it is possible to improve position accuracy without suffering a disadvantage due to vibration or with a small disadvantage.

(10) In the control device according to the aspect, the second-control-signal generating section may determine, based on information concerning mass of an object supported by the movable section, a frequency component to be reduced from the first control signal such that the frequency component to be reduced from the first control signal is smaller as the mass is larger.

With such a form, compared with a form for determining, without considering the mass of the object supported by the movable section, a frequency component to be reduced from the first control signal, it is possible to reduce vibration of the operation of the robot at a higher degree.

(11) According to another aspect of the present disclosure, a control method for controlling a robot is provided. The control method includes: (a) a step of preparing reference information including information concerning combinations of ranges of positions of a control point of a robot and frequencies; (b) a step of determining, based on a position of the control point of the robot in operation, with reference to the reference information, a frequency component to be reduced from a first control signal for performing operation for moving a movable section of the robot; (c) a step of reducing the determined frequency component from the first control signal and generating a second control signal; and (d) a step of generating, based on the second control signal, a driving signal for driving the robot.

(12) In the control method according to the aspect, the control point may be present at, of both ends of the movable section, an opposite end of an end coupled to a base supporting the movable section.

(13) In the control method according to the aspect, the step (c) may be a step of reducing, from the first control signal, components in a range of frequencies in predetermined width including the determined frequency and generating the second control signal, and the step (a) may be a step of preparing the reference information including information concerning two or more combinations of the ranges of the positions of the control point of the robot and the frequencies, ranges of any two of the positions being set such that the ranges of the frequencies including the frequencies associated with the respective positions do not overlap each other.

(14) In the control method according to the aspect, the reference information may include information concerning a first range, which is a range of positions associated with frequencies, and a second range, which is a range of positions associated with frequencies and is different from the first range, and the step (c) may be a step of reducing, from the first control signal for instructing operation in which the control point moves from a position in the first range to a position in the second range, a frequency component associated with the second range in the reference information and generating the second control signal.

(15) In the control method according to the aspect, the step (c) may be a step of further reducing, from the first control signal, a frequency component associated with the first range in the reference information and generating the second control signal.

(16) In the control method according to the aspect, the reference information may include information concerning a first range, which is a range of positions associated with frequencies, and a second range, which is a range of positions associated with frequencies and is different from the first range, and the step (c) may be a step of reducing, from the first control signal for instructing operation in which the control point moves from a position in the first range to a position in the second range, in generating the second control signal, in the first control signal, for a portion for instructing a first partial operation in which the control point moves in the first range, a frequency component associated with the first range in the reference information and reducing, in the first control signal, for a portion for instructing a second partial operation in which the control point moves in the second range, a frequency component associated with the second range in the reference information.

(17) In the control method according to the aspect, the reference information may include information concerning a first range, which is a range of positions associated with frequencies, and a second range, which is a range of positions associated with frequencies and is different from the first range, and the step (c) may be a step of reducing, from the first control signal for instructing operation in which the control point moves from a position in the first range to a position in the second range and in which the control point moves while changing speed of the control point at a predetermined change point in the second range, in generating the second control signal, in the first control signal, for a portion for instructing a first partial operation, which is operation before the control point reaches the change point, a frequency component associated with the first range in the reference information and reduce, in the first control signal, for a portion for instructing a second partial operation, which is operation after the control point reaches the change point, a frequency component associated with the second range in the reference information.

(18) In the control method according to the aspect, the reference information may further include information concerning a non-reduction range, which is a range of positions of the control point of the robot not associated with frequencies, and the step (c) may include a step of generating the second control signal without reducing a frequency component from the first control signal for instructing operation in which the control point moves in the non-reduction range.

(19) In the control method according to the aspect, the non-reduction range may be a range including at least a part of a base supporting the movable section.

(20) In the control method according to the aspect, the step (b) may be a step of determining, based on information concerning mass of an object supported by the movable section, a frequency component to be reduced from the first control signal such that the frequency component to be reduced from the first control signal is smaller as the mass is larger.

(21) According to another aspect of the present disclosure, a robot system is provided. The robot system includes: the control device explained above; and a robot controlled by the control device.

The present disclosure can be realized in various forms other than the robot control device, the robot control method, and the robot system. The present disclosure can be realized in forms such as a computer program for realizing the robot control method and a non-transitory recording medium recording the computer program.

Not all of a plurality of constituent elements included in the aspects of the present disclosure described above are essential. A part of the plurality of constituent elements can be changed, deleted, or substituted with other new constituent elements or a part of limitations of the constituent elements can be deleted as appropriate in order to solve a part or all of the problems described above or achieve a part or all of the effects described in this specification. A part or all of the technical features included in one aspect of the present disclosure described above can also be combined with a part or all of the technical features included in the other aspects of the present disclosure described above to form an independent one aspect of the present disclosure in order to solve a part or all of the problems described above or achieve a part or all of the effects described in this specification.

What is claimed is:

1. A control device for controlling a robot, comprising:
a memory configured to store a program and reference data, the reference data including relationships between first, second, and third reduction frequency components and first, second, and third movable areas, and a control point of an arm of the robot, the control point being configured to move within the first, second, and third movable areas; and
a processor configured to execute the program so as to:
obtain start vibration frequencies and end vibration frequencies in the first, second, and third movable areas;
generate an operation flow of the robot;
identify a start corresponding area of a start point of the control point from which the control point starts movement based on the operation flow with respect to the first, second, and third movable areas;
identify an end corresponding area of an end point of the control point at which the control point stops the movement based on the operation flow with respect to the first, second, and third movable areas;
obtain a first vibration frequency of the start vibration frequencies of the identified start corresponding area;
obtain a second vibration frequency of the end vibration frequencies of the identified end corresponding area;
obtain a start reduction frequency component corresponding to the identified start corresponding area and the first vibration frequency of the start vibration frequencies, the start reduction frequency component corresponding to one of the first, second, and third reduction frequency components;
obtain an end reduction frequency component corresponding to the identified end corresponding area and the second vibration frequency of the end vibration frequencies, the end reduction frequency component corresponding to another of the first, second, and third reduction frequency components;
reduce one of the start reduction frequency component or the end reduction frequency component from an original control signal for performing the operation flow of the robot to generate a reduction control signal; and
move the robot by the reduction control signal for performing the operation flow of the robot,
wherein the first movable area is below a rotation axis of the arm of the robot and adjacent to a base of the robot, the second movable area is above the first movable area and within a first moving trajectory of the control point of the arm, and the control point of the arm that is in a bent state moves along the first moving trajectory, the third movable area is around the second movable area and within a second moving trajectory of the control point of the arm, and the control point of the arm that is in an extended state moves along the second moving trajectory, the first reduction frequency component corresponding to the first movable area is smaller than the second reduction frequency component corresponding to the second movable area, and the second reduction frequency component corresponding to the second movable area is larger than the third reduction frequency component corresponding to the third movable area.

2. The control device according to claim 1, wherein the arm has first and second ends opposite to each other, and the first end of the arm is coupled to the base, and the control point is provided at the second end of the arm.

3. The control device according to claim 1, wherein the first, second, and third movable areas do not overlap one another.

4. The control device according to claim 1, wherein the processor is configured to reduce the end reduction frequency component from the original control signal for performing the operation flow of the robot to generate the reduction control signal.

5. The control device according to claim 1, wherein the processor is further configured to reduce the start reduction frequency component and the end reduction frequency component from the original control signal for performing the operation flow of the robot to generate the reduction control signal.

6. The control device according to claim 1, wherein, when the start corresponding area is the first movable area and the end corresponding area is the second movable area, the processor is configured to reduce the first reduction frequency component from the original control signal while the control point moves within the first movable area and reduce the second reduction frequency component from the original control signal while the control point moves within the second movable area according to the operation flow.

7. The control device according to claim 1, wherein the second movable area has a predetermined change point on which the control point moves according to the operation flow, and when the start corresponding area is the first movable area and the end corresponding area is the second movable area, the processor is configured to reduce the first reduction frequency component from the original control signal while the control point moves from the start point to the predetermined change point and reduce the second reduction frequency component from the original control signal while the control point moves from the predetermined change point to the end point.

8. The control device according to claim 1, wherein the first reduction frequency component has no value.

9. The control device according to claim 1, wherein the processor is configured to determine, based on information concerning mass of an object supported by the arm, a frequency component value of each of the first, second, and third reduction frequency components to be reduced from the original control signal such that the frequency component value is smaller as the mass is larger.

10. A control method for controlling a robot and for causing a processor to execute a program stored in a memory, the control method comprising executing on the processor the steps of:

storing reference data in the memory, the reference data including relationships between first, second, and third reduction frequency components and first, second, and third movable areas, and a control point of an arm of the robot, the control point being configured to move within the first, second, and third movable areas;

obtaining start vibration frequencies and end vibration frequencies in the first, second, and third movable areas;

generating an operation flow of the robot;

identifying a start corresponding area of a start point of the control point from which the control point starts movement based on the operation flow with respect to the first, second, and third movable areas;

identifying an end corresponding area of an end point of the control point at which the control point stops the movement based on the operation flow with respect to the first, second, and third movable areas;

obtaining a first vibration frequency of the start vibration frequencies of the identified start corresponding area;

obtaining a second vibration frequency of the end vibration frequencies of the identified end corresponding area;

obtaining a start reduction frequency component corresponding to the identified start corresponding area and the first vibration frequency of the start vibration frequencies, the start reduction frequency component corresponding to one of the first, second, and third reduction frequency components;

obtaining an end reduction frequency component corresponding to the identified end corresponding area and the second vibration frequency of the end vibration frequencies, the end reduction frequency component corresponding to another of the first, second, and third reduction frequency components;

reducing one of the start reduction frequency component or the end reduction frequency component from an original control signal for performing the operation flow of the robot to generate a reduction control signal; and moving the robot by the reduction control signal for performing the operation flow of the robot, wherein the first movable area is below a rotation axis of the arm of the robot and adjacent to a base of the robot, the second movable area is above the first movable area and within a first moving trajectory of the control point of the arm, and the control point of the arm that is in a bent state moves along the first moving trajectory, the third movable area is around the second movable area and within a second moving trajectory of the control point of the arm, and the control point of the arm that is in an extended state moves along the second moving trajectory, the first reduction frequency component corresponding to the first movable area is smaller than the second reduction frequency component corresponding to the second movable area, and the second reduction frequency component corresponding to the second movable area is larger than the third reduction frequency component corresponding to the third movable area.

11. The control method according to claim 10,
wherein the arm has first and second ends opposite to each other, and the first end of the arm is coupled to the base, and
the control point is provided at the second end of the arm.

12. The control method according to claim 10,
wherein the first, second, and third movable areas do not overlap one another.

13. The control method according to claim 10,
wherein the processor is configured to reduce the end reduction frequency component from the original control signal for performing the operation flow of the robot to generate the reduction control signal.

14. The control method according to claim 10,
wherein the processor is further configured to reduce the start reduction frequency component and the end reduction frequency component from the original control signal for performing the operation flow of the robot to generate the reduction control signal.

15. The control method according to claim 10,
wherein, when the start corresponding area is the first movable area and the end corresponding area is the second movable area, the processor is configured to reduce the first reduction frequency component from the original control signal while the control point moves within the first movable area and reduce the second reduction frequency component from the original control signal while the control point moves within the second movable area according to the operation flow.

16. The control method according to claim 10,
wherein the second movable area has a predetermined change point on which the control point moves according to the operation flow, and
when the start corresponding area is the first movable area and the end corresponding area is the second movable area, the processor is configured to reduce the first reduction frequency component from the original control signal while the control point moves from the start point to the predetermined change point and reduce the second reduction frequency component from the original control signal while the control point moves from the predetermined change point to the end point.

17. The control method according to claim 10,
wherein the first reduction frequency component has no value.

18. A robot system comprising:
a robot controlled by the control device; and
a control device for controlling the robot, the control device including:
a memory configured to store a program and reference data, the reference data including relationships between first, second, and third reduction frequency components and first, second, and third movable areas, and a control point of an arm of the robot, the control point being configured to move within the first, second, and third movable areas; and
a processor configured to execute the program so as to:
obtain start vibration frequencies and end vibration frequencies in the first, second, and third movable areas;
generate an operation flow of the robot;
identify a start corresponding area of a start point of the control point from which the control point starts movement based on the operation flow with respect to the first, second, and third movable areas;
identify an end corresponding area of an end point of the control point at which the control point stops the movement based on the operation flow with respect to the first, second, and third movable areas;
obtain a first vibration frequency of the start vibration frequencies of the identified start corresponding area;
obtain a second vibration frequency of the end vibration frequencies of the identified end corresponding area;
obtain a start reduction frequency component corresponding to the identified start corresponding area and the first vibration frequency of the start vibration frequencies, the start reduction frequency component corresponding to one of the first, second, and third reduction frequency components;
obtain an end reduction frequency component corresponding to the identified end corresponding area and the second vibration frequency of the end vibration frequencies, the end reduction frequency component corresponding to another of the first, second, and third reduction frequency components;
reduce one of the start reduction frequency component or the end reduction frequency component from an original control signal for performing the operation flow of the robot to generate a reduction control signal; and
move the robot by the reduction control signal for performing the operation flow of the robot,
wherein the first movable area is below a rotation axis of the arm of the robot and adjacent to a base of the robot,
the second movable area is above the first movable area and within a first moving trajectory of the control point of the arm, and the control point of the arm that is in a bent state moves along the first moving trajectory,
the third movable area is around the second movable area and within a second moving trajectory of the control point of the arm, and the control point of the arm that is in an extended state moves along the second moving trajectory,
the first reduction frequency component corresponding to the first movable area is smaller than the second reduction frequency component corresponding to the second movable area, and
the second reduction frequency component corresponding to the second movable area is larger than the third reduction frequency component corresponding to the third movable area.

* * * * *